US012804637B2

(12) United States Patent
Yuan et al.

(10) Patent No.: US 12,804,637 B2
(45) Date of Patent: Nov. 17, 2026

(54) PRIORITIZATION OF UPLINK COMMUNICATIONS VIA MULTIPLE ANTENNA PANELS

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Shaozhen Guo, Beijing (CN); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

(21) Appl. No.: 18/004,873

(22) PCT Filed: Aug. 3, 2020

(86) PCT No.: PCT/CN2020/106512
§ 371 (c)(1),
(2) Date: Jan. 9, 2023

(87) PCT Pub. No.: WO2022/027163
PCT Pub. Date: Feb. 10, 2022

(65) Prior Publication Data

US 2023/0362922 A1 Nov. 9, 2023

(51) Int. Cl.
*H04W 72/1268* (2023.01)
*H04W 72/21* (2023.01)
*H04W 72/566* (2023.01)

(52) U.S. Cl.
CPC ....... *H04W 72/1268* (2013.01); *H04W 72/21* (2023.01); *H04W 72/566* (2023.01)

(58) Field of Classification Search
CPC ............. H04W 72/1268; H04W 72/21; H04W 72/566; H04B 7/0413; H04B 7/0608; H04B 7/0691; H04L 5/0037; H04L 5/0023
See application file for complete search history.

(56) References Cited

U.S. PATENT DOCUMENTS

2012/0008577 A1* 1/2012 Han ..................... H04B 7/0686 370/329
2012/0057535 A1 3/2012 Zhang et al.
(Continued)

FOREIGN PATENT DOCUMENTS

CN 109906576 A 6/2019
EP 3416434 A1 12/2018
(Continued)

OTHER PUBLICATIONS

Supplementary European Search Report—EP20948536—Search Authority—Munich—Apr. 2, 2024 (206325EP).
(Continued)

*Primary Examiner* — Rina C Pancholi
(74) *Attorney, Agent, or Firm* — Holland & Hart LLP/QUALCOMM Incorporated

(57) ABSTRACT

Methods, systems, and devices for wireless communications are described. A user equipment (UE) may identify uplink communications which are associated with different antenna panels and scheduled to at least partially overlap in time. The UE may resolve the overlap based on a set of rules for concurrent uplink communications associated with different antenna panels. Based on resolving the overlap, the UE may transmit at least a portion of the first set of uplink communications or at least a portion of the second set of uplink communications via the first antenna panel or the second antenna panel.

33 Claims, 13 Drawing Sheets

(56) References Cited

U.S. PATENT DOCUMENTS

| | | | | |
|---|---|---|---|---|
| 2019/0036582 | A1 | 1/2019 | Park et al. | |
| 2019/0327691 | A1* | 10/2019 | Zhang | H04W 52/226 |
| 2019/0364561 | A1* | 11/2019 | Xiong | H04L 5/0051 |
| 2020/0128576 | A1 | 4/2020 | Jung et al. | |
| 2020/0196265 | A1 | 6/2020 | Ryu et al. | |
| 2020/0205150 | A1* | 6/2020 | Cheng | H04W 72/21 |

FOREIGN PATENT DOCUMENTS

| | | | |
|---|---|---|---|
| WO | WO-2020033253 | | 2/2020 |
| WO | WO-2020061467 | | 3/2020 |
| WO | WO-2020092264 | A1 | 5/2020 |
| WO | WO-2020110244 | A1 | 6/2020 |

OTHER PUBLICATIONS

CATT: "Consideration on COMP in RAN3", 3GPPTSG RAN WG3 Meeting #64, 3GPP Draft; R3-091245, 3rd Generation Partnership Project (3GPP), Mobile Competence Centre ; 650, Route Des Lucioles ; F-06921 Sophia-Antipolis Cedex ; France, no. San Francisco, USA; Apr. 29, 2009, Apr. 29, 2009 (Apr. 29, 2009), pp. 1-3, XP050341603, [retrieved on Apr. 29, 2009], The Whole Document.

International Search Report and Written Opinion—PCT/CN2020/106512—ISA/EPO—May 7, 2021 (206325WO1).

* cited by examiner

PRIORITIZATION OF UPLINK COMMUNICATIONS VIA MULTIPLE ANTENNA PANELS

CROSS REFERENCE

The present Application is a 371 national stage filing of International PCT Application No. PCT/CN2020/106512 by Yuan et al. entitled "PRIORITIZATION OF UPLINK COMMUNICATIONS VIA MULTIPLE ANTENNA PANELS," filed Aug. 3, 2020, which is assigned to the assignee hereof, and which is expressly incorporated by reference in its entirety herein.

FIELD OF TECHNOLOGY

The following relates to wireless communications, including prioritization of uplink communications via multiple antenna panels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some UEs may include multiple antenna panels.

SUMMARY

The described techniques relate to improved methods, systems, devices, and apparatuses that support prioritization of uplink communications via multiple antenna panels. Generally, the described techniques provide for resolving overlapping uplink communications associated with different antenna panels.

A method of wireless communication at a UE is described. The method may include identifying a first set of one or more uplink communications associated with a first antenna panel of a set of antenna panels of the UE, identifying a second set of one or more uplink communications associated with a second antenna panel of the set of antenna panels, where the first set of one or more uplink communications are scheduled to at least partially overlap in time with the second set of one or more uplink communications, resolving the overlap between the first set of one or more uplink communications and the second set of one or more uplink communications based on one or more rules for concurrent uplink transmissions associated with different antenna panels of the set of antenna panels, and transmitting, based on resolving the overlap, at least a portion of the first set of one or more uplink communications, at least a portion of the second set of one or more uplink communications, or a combination thereof via at least one of the first antenna panel and the second antenna panel.

An apparatus for wireless communication at a UE is described. The apparatus may include a processor, memory coupled with the processor, and instructions stored in the memory. The instructions may be executable by the processor to cause the apparatus to identify a first set of one or more uplink communications associated with a first antenna panel of a set of antenna panels of the UE, identify a second set of one or more uplink communications associated with a second antenna panel of the set of antenna panels, where the first set of one or more uplink communications are scheduled to at least partially overlap in time with the second set of one or more uplink communications, resolv the overlap between the first set of one or more uplink communications and the second set of one or more uplink communications based on one or more rules for concurrent uplink transmissions associated with different antenna panels of the set of antenna panels, and transmit, based on resolving the overlap, at least a portion of the first set of one or more uplink communications, at least a portion of the second set of one or more uplink communications, or a combination thereof via at least one of the first antenna panel and the second antenna panel.

Another apparatus for wireless communication at a UE is described. The apparatus may include means for identifying a first set of one or more uplink communications associated with a first antenna panel of a set of antenna panels of the UE, identifying a second set of one or more uplink communications associated with a second antenna panel of the set of antenna panels, where the first set of one or more uplink communications are scheduled to at least partially overlap in time with the second set of one or more uplink communications, resolving the overlap between the first set of one or more uplink communications and the second set of one or more uplink communications based on one or more rules for concurrent uplink transmissions associated with different antenna panels of the set of antenna panels, and transmitting, based on resolving the overlap, at least a portion of the first set of one or more uplink communications, at least a portion of the second set of one or more uplink communications, or a combination thereof via at least one of the first antenna panel and the second antenna panel.

A non-transitory computer-readable medium storing code for wireless communication at a UE is described. The code may include instructions executable by a processor to identify a first set of one or more uplink communications associated with a first antenna panel of a set of antenna panels of the UE, identify a second set of one or more uplink communications associated with a second antenna panel of the set of antenna panels, where the first set of one or more uplink communications are scheduled to at least partially overlap in time with the second set of one or more uplink communications, resolv the overlap between the first set of one or more uplink communications and the second set of one or more uplink communications based on one or more rules for concurrent uplink transmissions associated with different antenna panels of the set of antenna panels, and transmit, based on resolving the overlap, at least a portion of the first set of one or more uplink communications, at least a portion of the second set of one or more uplink communications, or a combination thereof via at least one of the first antenna panel and the second antenna panel.

Some examples of the method, apparatuses, and non-transitory computer-readable medium described herein may further include operations, features, means, or instructions for receiving an indication of whether the UE may be allowed to transmit uplink control information associated with a respective antenna panel of the set of antenna panels via a different antenna panel of the set of antenna panels, where resolving the overlap may be based on the indication.

Some examples of the method, apparatuses, and non-transitory computer-readable medium described herein may further include operations, features, means, or instructions for determining, based on the indication, that the UE may be allowed to transmit uplink control information associated with the second antenna panel via the first antenna panel, where the transmitting includes transmitting, via the first antenna panel, an uplink channel that includes the uplink control information associated with the second antenna panel.

In some examples of the method, apparatuses, and non-transitory computer-readable medium described herein, the transmitting further may include operations, features, means, or instructions for refraining, based at least in part transmitting uplink channel via the first antenna panel that includes the uplink control information associated with the second antenna panel, from transmitting an uplink control channel via the second antenna panel.

In some examples of the method, apparatuses, and non-transitory computer-readable medium described herein, the transmitting further may include operations, features, means, or instructions for transmitting an uplink shared channel via the second antenna panel at least partially concurrently with transmitting the uplink channel via the first antenna panel.

Some examples of the method, apparatuses, and non-transitory computer-readable medium described herein may further include operations, features, means, or instructions for determining, based on the indication, that uplink control information associated with the second antenna panel must be transmitted via the second antenna panel, where the transmitting includes transmitting the uplink control information associated with the second antenna panel within an uplink channel via the second antenna panel.

Some examples of the method, apparatuses, and non-transitory computer-readable medium described herein may further include operations, features, means, or instructions for determining, based on the indication, that uplink control information associated with the second antenna panel must be transmitted via the second antenna panel, identifying, among the first set of one or more uplink communications associated with the first antenna panel, a first uplink communication having a first priority index and a second uplink communication having a second priority index greater than the first priority index, identifying, among the second set of one or more uplink communications associated with the second antenna panel, a third uplink communication having the first priority index and a fourth uplink communication having the second priority index, and selecting, based on the one or more rules, an uplink communication from among a set of candidate communications that includes the first uplink communication, the second uplink communication, the third uplink communication, and the fourth uplink communication, where the transmitting includes transmitting the selected uplink communication.

Some examples of the method, apparatuses, and non-transitory computer-readable medium described herein may further include operations, features, means, or instructions for identifying the first uplink communication includes resolving, based on the one or more rules, a first overlap in time among a third set of uplink communications each associated with the first antenna panel and having the first priority index, and identifying the second uplink communication includes resolving, based on the one or more rules, a second overlap in time among a fourth set of uplink communications each associated with the first antenna panel and having the second priority index.

In some examples of the method, apparatuses, and non-transitory computer-readable medium described herein, the first uplink communication includes an uplink shared channel communication, and resolving the first overlap may include operations, features, means, or instructions for inserting uplink control information into the first uplink communication, the inserted uplink control information associated with an uplink control channel communication included in the third set of uplink communications.

In some examples of the method, apparatuses, and non-transitory computer-readable medium described herein, the selecting includes, selecting, from among the first uplink communication and the second uplink communication, a first uplink shared channel communication based on a priority index of the first uplink shared channel communication, selecting, from among the first uplink communication and the second uplink communication, a first uplink shared channel communication based on a priority index of the first uplink shared channel communication, selecting, from among the third uplink communication and the fourth uplink communication, a second uplink shared channel communication based on a priority index of the second uplink shared channel communication. In some aspects, the transmitting includes, transmitting the first uplink shared channel communication via the first antenna panel, and transmitting the second uplink shared channel communication via the second antenna panel.

In some examples of the method, apparatuses, and non-transitory computer-readable medium described herein, the first uplink shared channel communication includes uplink control information associated with the first antenna panel; or, and the second uplink shared channel communication includes uplink control information associated with the first antenna panel.

In some examples of the method, apparatuses, and non-transitory computer-readable medium described herein, the selecting includes, selecting, from among the first uplink communication and the second uplink communication, an uplink shared channel communication based on a priority index of the uplink shared channel communication, selecting, from among the third uplink communication and the fourth uplink communication, an uplink control channel communication based on a priority index of the uplink control channel communication. In some aspects, the transmitting includes, transmitting the uplink shared channel communication via the first antenna panel, and transmitting the uplink control channel communication via the second antenna panel.

In some examples of the method, apparatuses, and non-transitory computer-readable medium described herein, the uplink shared channel communication includes uplink control information associated with the first antenna panel.

In some examples of the method, apparatuses, and non-transitory computer-readable medium described herein, the selecting includes, selecting, from among the first uplink communication and the second uplink communication, a first uplink control channel communication based on a priority index of the first uplink control channel communication, selecting, from among the third uplink communication and the fourth uplink communication, a second uplink control channel communication based on a priority index of the second uplink control channel communication, the transmitting includes, transmitting the first uplink control channel communication via the first antenna panel, and transmitting the second uplink control channel communication via the second antenna panel.

In some examples of the method, apparatuses, and non-transitory computer-readable medium described herein, the selecting may be based on a respective priority index for each candidate communication of the set of candidate communications, a respective antenna panel associated with each candidate communication of the set of candidate communications, a respective channel type for each candidate communication of the set of candidate communications, a respective type of uplink control information associated with each candidate communication of the set of candidate communications, or any combination thereof.

In some examples of the method, apparatuses, and non-transitory computer-readable medium described herein, the selecting prioritizes the respective priority index for each candidate communication of the set of candidate communications over the respective type of uplink control information associated with each candidate communication of the set of candidate communications.

In some examples of the method, apparatuses, and non-transitory computer-readable medium described herein, the selecting prioritizes the respective type of uplink control information associated with each candidate communication of the set of candidate communications over the respective priority index for each candidate communication of the set of candidate communications.

In some examples of the method, apparatuses, and non-transitory computer-readable medium described herein, the selecting results in a single selected uplink communication.

In some examples of the method, apparatuses, and non-transitory computer-readable medium described herein, the indication of whether the UE may be allowed to transmit the uplink control information associated with the respective antenna panel of the set of antenna panels via the different antenna panel of the set of antenna panels includes a radio resource control parameter.

Some examples of the method, apparatuses, and non-transitory computer-readable medium described herein may further include operations, features, means, or instructions for receiving an indication that uplink control information associated with a respective antenna panel of the set of antenna panels may be transmitted via a different antenna panel of the set of antenna panels, identifying, among the first set of one or more uplink communications associated with the first antenna panel, a first uplink communication having a first priority index and a second uplink communication having a second priority index greater than the first priority index, identifying, among the second set of one or more uplink communications associated with the second antenna panel, a third uplink communication having the first priority index and a fourth uplink communication having the second priority index, selecting, based on the indication and the one or more rules, an uplink communication from among a set of candidate communications that includes the first uplink communication, the second uplink communication, the third uplink communication, and the fourth uplink communication. In some aspects, the selecting may be based on a respective priority index for each candidate communication of the set of candidate communications, a respective antenna panel associated with each candidate communication of the set of candidate communications, a respective channel type for each candidate communication of the set of candidate communications, or any combination thereof, the selected uplink communication includes the uplink control information associated with the respective antenna panel, and the transmitting includes transmitting the selected uplink communication via the different antenna panel.

In some examples of the method, apparatuses, and non-transitory computer-readable medium described herein, the selecting prioritizes the respective priority index for each candidate communication of the set of candidate communications over the respective antenna panel associated with each candidate communication of the set of candidate communications.

In some examples of the method, apparatuses, and non-transitory computer-readable medium described herein, the selecting prioritizes the respective antenna panel associated with each candidate communication of the set of candidate communications over the respective priority index for each candidate communication of the set of candidate communications.

In some examples of the method, apparatuses, and non-transitory computer-readable medium described herein, the selecting prioritizes the respective priority index for each candidate communication of the set of candidate communications over the respective antenna panel associated with each candidate communication of the set of candidate communications.

Some examples of the method, apparatuses, and non-transitory computer-readable medium described herein may further include operations, features, means, or instructions for receiving a second indication of a feedback mode for transmitting acknowledgement information for downlink communications associated with the first antenna panel and the second antenna panel, where resolving the overlap may be based on the second indication.

In some examples of the method, apparatuses, and non-transitory computer-readable medium described herein, the first antenna panel corresponds to a first input or output for multiple-input and multiple-output (MIMO) communications by the UE, and the second antenna panel corresponds to a second input or output for MIMO communications by the UE.

DETAILED DESCRIPTION

Figure 1:
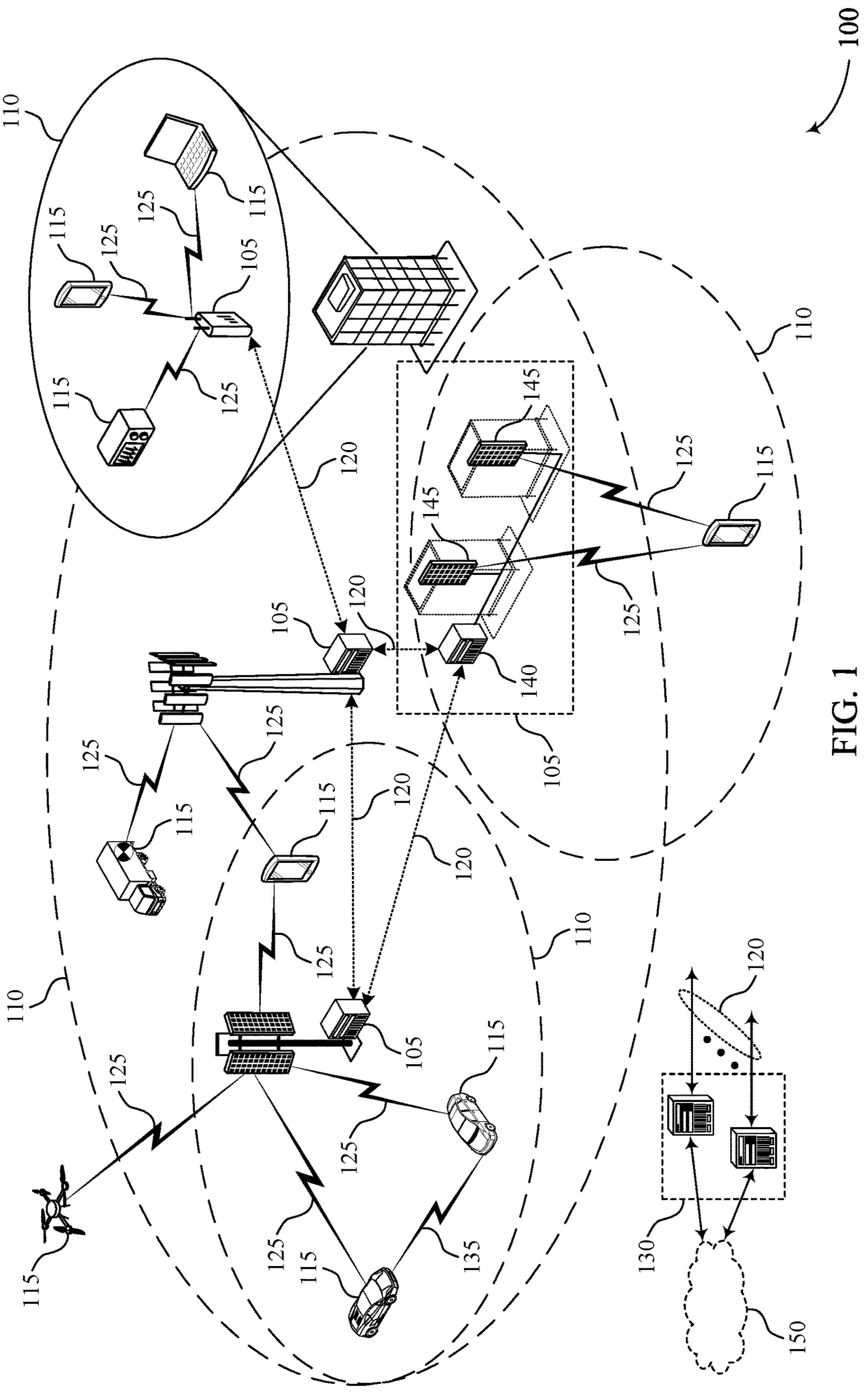
FIG. 1 illustrates an example of a wireless communications system that supports prioritization of uplink communications via multiple antenna panels in accordance with aspects of the present disclosure.

In some wireless communications systems, overlapping (e.g. at least partially concurrent) uplink transmissions by a user equipment (UE) via different antenna panels of the UE may not be allowed (e.g., a network may be configured to schedule communications by the UE so as to avoid the occurrence of overlapping uplink transmissions by the UE via different antenna panels of the UE). In wireless communications systems where overlapping uplink transmissions by a UE via different antenna panels of the UE are allowed, however, techniques as described herein may be used to resolve one or more conflicts between such communications (e.g., select between or among such communications, combine or multiplex such communications together, etc.), and the UE may subsequently transmit one or more uplink transmissions based on resolving the one or more conflicts.

The UE may identify a first set of uplink communications associated with a first antenna panel and a second set of uplink communications associated with a second antenna panel, where sets of the uplink communications are scheduled to at least partially overlap in time. The UE may resolve the overlap based on a set of rules for concurrent uplink transmissions associated with different antenna panels. Based on resolving the overlap, the UE may transmit at least a portion of the first set of uplink communications, at least a portion of the second set of uplink communications, or a combination thereof via at least one of the first antenna panel or the second antenna panel. Though certain examples herein may be described with reference to two panels, it is to be understood that these and any other examples provided herein involving specific quantities are provided solely for the sake of illustrative clarity and are not limiting of the claims.

The UE may receive one or more indications, such as radio resource control (RRC) parameters, where applying the rules may include taking different actions depending on the content of the indications (e.g., the value of the parameters). For example, the UE may receive an indication (an RRC parameter, which may be referred to as across-multiplexing) of whether uplink control information (UCI) associated with a respective antenna panel (e.g., a first antenna panel) may be transmitted via a different antenna panel (e.g., a second antenna panel), which may be referred to herein as cross-multiplexing. As another example, the UE may receive an indication (an RRC parameter, which may be referred to as ACKNACKFeedbackMode) of a feedback mode of the UE (e.g., whether the UE may bundle acknowledgement information for multiple downlink transmissions into a single feedback message, which may be referred to as a JointFeedback mode, or is to send acknowledgement information in separate feedback messages for each downlink transmission, which may be referred to as a SeparateFeedback mode). Based on the set of rules, whether cross-multiplexing is enabled or disabled, the feedback mode of the UE, or any combination thereof, the UE may resolve overlaps between concurrent uplink transmissions associated with different antenna panels.

For example, when cross-multiplexing is enabled, the UE may transmit UCI associated with a second antenna panel within an uplink channel-such as a physical uplink shared channel (PUSCH) or physical uplink control channel (PUCCH)-sent via a first antenna panel. The UE may in some such cases refrain from concurrently transmitting via the second antenna panel associated with the UCI, as the UCI has been handled via the first antenna panel. As another example, when cross-multiplexing is disabled, the UE may transmit UCI associated with an antenna panel within an uplink channel (e.g., PUSCH or PUCCH) via that same antenna panel.

Further techniques are described herein regarding how a UE may select one or more uplink communications to transmit via an individual panel when cross-multiplexing is disabled (e.g., select among overlapping uplink communications associated with the panel). For example, the UE may choose one or more uplink communications to transmit based on various prioritization rules, where prioritization may be based on criteria such as the respective priority index, antenna panel, channel type, and UCI type of different overlapping uplink communications.

Further techniques are also described herein regarding how a UE may select an antenna panel via which to transmit UCI when the cross-multiplexing is enabled (or, additionally or alternatively, when the feedback mode of the UE is a JointFeedback mode). In some aspects, the UE may choose the antenna panel via which to transmit UCI based on criteria such as the respective priority index, antenna panel, and channel type of different overlapping uplink communications.

Aspects of the disclosure are initially described in the context of a wireless communications system. Examples of processes and signaling exchanges that support prioritization of uplink communications via multiple antenna panels are then described. Aspects of the disclosure are further illustrated by and described with reference to apparatus diagrams, system diagrams, and flowcharts that relate to prioritization of uplink communications via multiple antenna panels.

FIG. 1 illustrates an example of a wireless communications system 100 that supports prioritization of uplink communications via multiple antenna panels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., Nr) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink communications, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, an individual antenna panel may correspond to an individual input or output for MIMO communications. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may use multiple antenna panels for transmission or reception. As noted above, for example, each antenna panel may correspond to a different input or output for MIMO communications. Each antenna panel may, additionally or alternatively, support an independently transmitted and received set of concurrent (e.g., at least partially overlapping in time) communications.

In some cases, each antenna panel may be distinguished from each other antenna panel via a unique identifier. It should be noted, however, that the antenna panel or antenna panel identifier may be used for illustration purposes, and other example alternatives for referring to or indicating an antenna panel may be used. For example, an antenna panel may be associated with a set of downlink signals and channels (or a set of uplink signals and channels). The antenna panel identifier for the antenna panel may be associated with the set of signals or channel identifiers and may be indicated by or derived from the signals or channel identifiers.

In one example, a control resource set (CORESET) may be configured with a CORESET pool index. A first antenna panel may be associated with a downlink control indication (DCI) in a CORESET with a first CORESET pool index value (e.g., 0) and a second antenna panel may be associated with a DCI in a CORESET with a second CORESET pool index value (e.g., 1). In another example, a sounding reference signal (SRS) set identifier or SRS resource identifier may be associated with the first antenna panel and another SRS set identifier or SRS resource identifier may be associated with the second antenna panel. Further, a beam identifier or beam group identifier may be associated with the first antenna panel, and another beam identifier or beam group identifier may be associated with the second antenna panel.

The beam can be a transmission configuration indication (TCI) state or a spatial filter setting for either downlink reception or uplink communication and can be a spatial relation information indicated for transmitting uplink signals. The beam may be indicated by a reference signal (RS) such as synchronization signal block (SSB), channel-state-information (CSI) RS or SRS. When a group of beam identifiers are configured, the first half group of beam identifiers may be associated with the first antenna panel, and the second half group of beam identifiers may be associated with the second antenna panel. When a pair of TCI states are indicated, the first TCI state identifier in the pair may be associated with the first antenna panel, and the second TCI state identifier in the pair may be associated with the second panel.

An uplink transmit power control configuration may include a close loop index, and a uplink communication with a first close loop index value (e.g., 0) may be associated with the first antenna panel and another uplink communication with a second close loop index value (e.g., 1) may be associated with the second antenna panel. An antenna port identifier (also referred to as an antenna port group identifier) may be associated with the first antenna panel, and another antenna port identifier (or antenna port group identifier) may be associated with the second antenna panel. In some examples, the antenna port may include (but not be limited to) a PUSCH antenna port, SRS antenna port, and phase-tracking RS antenna port.

A DMRS code division multiplexing (CDM) group identifier may be associated with the first antenna panel, and another DMRS CDM group identifier may be associated with the second antenna panel. When multiple DMRS CDM groups are indicated, the first DMRS CDM group may be associated with the first antenna panel, and the second DMRS CDM group may be associated with the second antenna panel. A timing advance group (TAG) identifier may be associated with the first antenna panel, and another TAG identifier may be associated with the second antenna panel.

A PUCCH resource identifier or resource group identifier may be associated with the first antenna panel, and another PUCCH resource identifier or resource group identifier may be associated with the second antenna panel. When a group of PUCCH resource identifiers are configured, the first half group of PUCCH resource identifiers may be associated with the first antenna panel, and the second half group of PUCCH resource identifiers may be associated with the second antenna panel. A radio network temporary identifier (RNTI) may be associated with the first antenna panel, and another RNTI may be associated with the second antenna panel. A physical cell identity (PCI) or synchronization signal block (SSB) set identifier may be associated with the first antenna panel, and another PCI or SSB set identifier may be associated with the second antenna panel. By referring to or indicating the signal or channel IDs, the corresponding panel identifier may be referred to or indicated.

According to examples of aspects described herein, a UE 115 may resolve overlapping uplink communications associated with different antenna panels of the UE 115 based on a set of rules for concurrent uplink communications. For example, the UE 115 may identify a first set of uplink communications associated with a first antenna panel and a second set of uplink communications associated with a second antenna panel, where the first set of the uplink communications and second set of uplink communications are scheduled to at least partially overlap in time. In some aspects, the UE 115 may resolve the overlap based on a set of rules for concurrent uplink communications associated with different antenna panels of the UE 115. Based on resolving the overlap, the UE 115 may transmit at least a portion of the first set of uplink communications or at least a portion of the second set of uplink communications via the first antenna panel or the second antenna panel.

Figure 2:
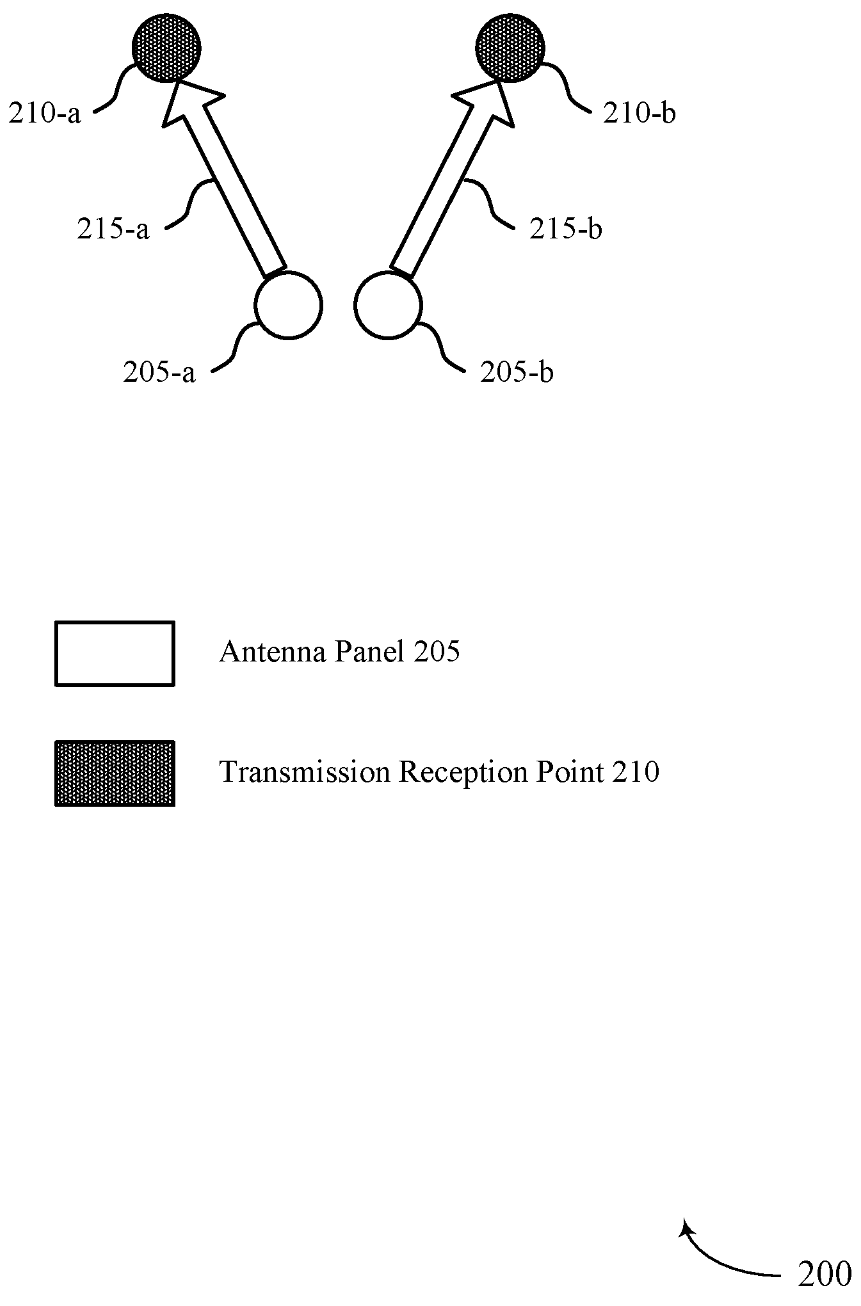
FIG. 2 illustrates an example of a wireless communications system that supports prioritization of uplink communications via multiple antenna panels in accordance with aspects of the present disclosure.

FIG. 2 illustrates an example of a wireless communications system 200 that supports prioritization of uplink communications via multiple antenna panels in accordance with aspects of the present disclosure. In some examples, the example 200 may be implemented by aspects of wireless communication system 100.

Referring to FIG. 2, a UE 115 may include multiple antenna panels 205 (e.g., antenna panel 205-*a* and antenna panel 205-*b*). Each of the antenna panels 205 may have a corresponding panel identifier, or communications associated with the different antenna panels may be identified (e.g., indexed) as such, as described herein with reference to FIG. 1. For example, each of the antenna panels 205 may have an explicit panel identifier associated with a set of signals (e.g. uplink signals, downlink signals) and channels (e.g., uplink communication channel, downlink communication channel). Each of the antenna panels 205 may correspond to a respective input or output for MIMO communications by the UE 115.

The UE 115 may connect to a network (e.g., the wireless communications system 100) by transmitting signals to (and receiving signals from) one or more transmission and reception points (TRPs) 210 (e.g., TRP 210-*a*, TRP 210-*b*) of a base station 105 connected to the network. TRP 210-*a* and TRP 210-*b* may be associated with the same base station 105, or TRP 210-*a* and TRP 210-*b* may each be associated with a different base station 105.

In an example, the UE 115 may identify uplink communications 215 associated with the antenna panels 205. For example, the UE 115 may identify uplink communications 215-*a* associated with antenna panel 205-*a* of the UE 115. The UE 115 may identify uplink communications 215-*b* associated with antenna panel 205-*b* of the UE 115. In some aspects, the uplink communications 215-*a* may be an uplink shared channel transmission (e.g., PUSCH), and the uplink communications 215-*b* may be an uplink channel transmission (e.g., PUCCH) including UCI. In some other aspects, each of the uplink communications 215-*a* and the uplink communications 215-*b* may include an uplink shared channel transmission (e.g., PUSCH) or an uplink channel transmission (e.g., PUCCH) including UCI. The UE 115 may receive DCI (e.g., DCI1) which schedules the uplink communications 215-*a* and DCI (e.g., DCI2) which schedules the uplink communications 215-*b*. In an example, the antenna panel 205-*a* may be associated with the DCI1 (e.g., DCI1 may be associated with a CORESET of CORESET pool value 0, and the antenna panel 205-*a* may be a first antenna panel), and the antenna panel 205-*b* may be associated with the DCI2 (e.g., DCI2 may be associated with a CORESET of CORESET pool value 1, and the antenna panel 205-*b* may be a second antenna panel).

In some aspects, the uplink communications 215-*a* and the uplink communications 215-*b* may be scheduled to at least partially overlap (e.g., in the time domain). The UE 115 may determine the overlap (e.g., in the time domain) between the uplink communications 215-*a* and the uplink communications 215-*b* based on scheduling information indicated in DCI1 and DCI2. The UE 115 may resolve the overlap between the uplink communications 215-*a* and the uplink communications 215-*b* based on a set of rules for concurrent uplink communications over different antenna panels 205 (e.g., including the antenna panel 205-*a* and antenna panel 205-*b*) of the UE 115. Based on resolving the overlap, the UE 115 may transmit at least a portion of the uplink communications 215-*a*, at least a portion of the uplink communications 215-*b*, or a combination thereof, via the same antenna panel. For example, the UE 115 may transmit at least a portion of the uplink communications 215-*a* and at least a portion of the uplink communications 215-*b* via the antenna panel 205-*a* or the antenna panel 205-*b*.

The UE 115 may an indication of whether cross-multiplexing is enabled, which may correspond to whether the UE 115 may transmit UCI associated with a respective antenna panel (e.g., antenna panel 205-*b*) via a different antenna panel (e.g., antenna panel 205-*a*). In some aspects, such an indication may be or include an RRC parameter (e.g., an RRC parameter that may be referred to as across-multiplexing and that may have a value of enabled or disabled). Based on the set of rules, whether cross-multiplexing is enabled, a feedback mode of the UE 115, or any combination thereof, the UE 115 may resolve overlaps between concurrent uplink communications associated with different antenna panels of the UE 115 (e.g., resolve the overlap between the uplink communications 215-*a* and the uplink communications 215-*b* based on a set of rules for concurrent uplink communications over different antenna panels 205). In some cases, the feedback mode may be configured (e.g., indicated) by the value of a separate RRC parameter (e.g., ACKNACK-FeedbackMode). Examples of aspects of resolving the overlap based on the set of rules are described further herein.

One or more aspects of the techniques described herein may be implemented to realize one or more potential advantages. In some aspects, transmitting at least a portion of an uplink communication (e.g., uplink communications 215-*a*) and at least a portion of another uplink communication (e.g., uplink communications 215-*b*) over the same antenna panel (e.g., antenna panel 205-*a*, antenna panel 205-*b*) of a UE 115 for cases in which the uplink communications overlap in time may increase spectrum utilization and spectral efficiency. For example, the implementations described herein may advantageously utilize resources through dynamic horizontal (e.g., across the time domain) sharing of the resources. In an example, by configuring a UE 115 for multi-panel simultaneous transmission, the aspects described herein may advantageously utilize resources (e.g., across the time domain) compared to some wireless communications systems in which uplink communications associated with different antenna panels and different TRPs (e.g., an uplink communication scheduled for transmission from the antenna panel 205-*a* to the TRP 210-*a* and an uplink communication scheduled for transmission from the antenna panel 205-*b* to the TRP 210-*b*) are scheduled to be non-overlapping in time.

Figure 3A:
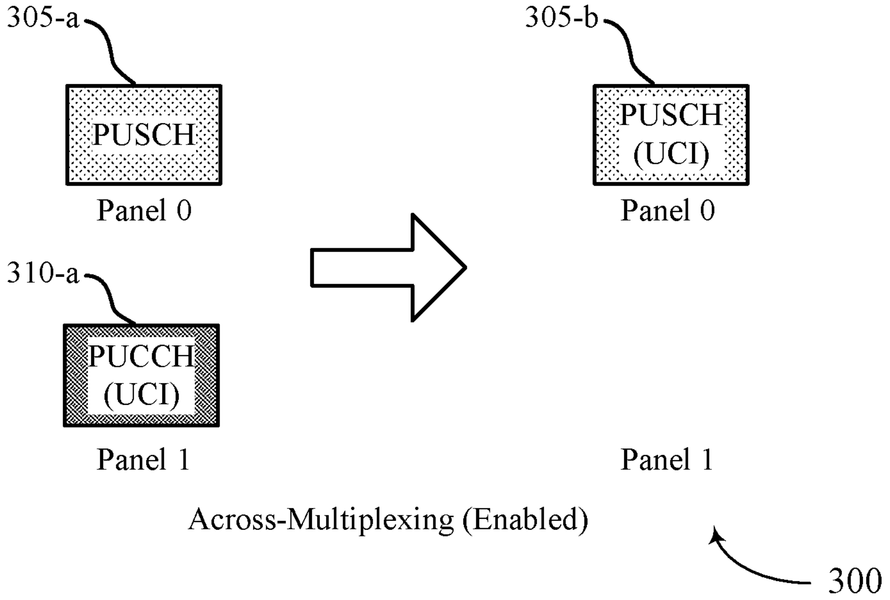
FIGS. 3A and 3B illustrate examples of uplink communications via multiple antenna panels in accordance with aspects of the present disclosure.
Figure 3B:
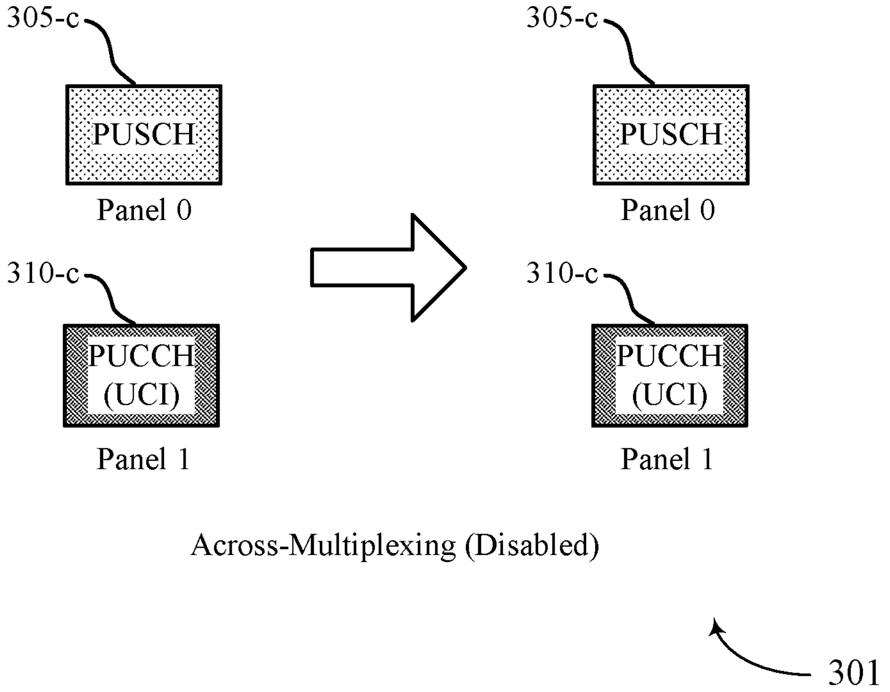

FIGS. 3A and 3B illustrate examples 300 and 301 of uplink communications via multiple antenna panels in accordance with aspects of the present disclosure. In some examples, examples 300 and 301 may be implemented by aspects of wireless communication system 100 and wireless communications system 200. PUSCH 305-*a* and PUSCH 305-*b* may be examples of uplink communications 215-*a* as described with reference to FIG. 2. In some aspects, PUSCH 305-*a* and PUSCH 305-*b* may be associated with a Panel 0 of a UE 115, which may include examples of aspects of antenna panel 205-*a* described with reference to FIG. 2. PUCCH 310-*a* may be examples of aspects of uplink communications 215-*b* described with reference to FIG. 2. In some aspects, PUCCH 310-*a* may be associated with a Panel 1 of the UE 115, which may include examples of aspects of antenna panel 205-*b* described with reference to FIG. 2.

With reference to FIGS. 3A and 3B, a UE 115 may be configurable for multi-panel simultaneous transmission. The UE 115 may receive a first indication (e.g., an RRC parameter across-multiplexing) of whether cross-multiplexing is enabled. The UE 115 may receive a second indication (e.g., an RRC parameter ACKNACKFeedbackMode, which may be set to SeparateFeedback or JointFeedback) of a feedback mode for transmitting acknowledgement information for downlink communications associated with a first antenna panel (e.g., Panel 0) and the second antenna panel (e.g., Panel 1).

With reference to FIG. 3A, the UE 115 may determine, based on the first indication (e.g., based on the RRC parameter across-multiplexing being set to 'enabled'), that cross-multiplexing is enabled, and thus that the UE 115 is allowed to transmit UCI (e.g., UCI of PUCCH 310-*a*) associated with the second antenna panel (e.g., Panel 1) via the first antenna panel (e.g., Panel 0). The UE 115 may further determine that the UE 115 is allowed to transmit UCI (e.g., UCI of PUCCH 310-*a*) associated with the second antenna panel (e.g., Panel 1) via the first antenna panel (e.g., Panel 0), based on the second indication (e.g., based on the RRC parameter ACKNACKFeedbackMode set to SeparateFeedback). The UE may resolve an overlap between a first set of uplink communications (e.g., PUSCH 305-*a*) and a second set of uplink communications (e.g., PUCCH 310-*a*) based on such indications and an associated set of rules for concurrent uplink communications over different antenna panels (e.g., including Panel 0 and Panel 1) of the UE 115.

For example, because cross-multiplexing is enabled, the UE may insert and transmit the UCI of PUCCH 310-*a* within the PUSCH 305-*a* (e.g., multiplex the UCI of the PUCCH 310-*a* onto the PUSCH 305-*a*), an example result of which is shown by the PUSCH 305-*b*. Thus, the UE 115 may transmit, via the first antenna panel (e.g., Panel 0), an uplink channel that includes the UCI associated with the second antenna panel (e.g., Panel 1). The UCI of the PUCCH 310-*a* may include any combination of HARQ-ACK information, CSI reports, and a scheduling request. In some aspects, when inserting the UCI of the PUCCH 310-*a* onto the PUSCH 305-*a*, the UE 115 may multiplex the UCI (e.g., the HARQ-ACK information, CSI reports, scheduling request) onto the PUSCH 305-*a*.

In some aspects, based on inserting the UCI of PUCCH 310-*a* within the PUSCH 305-*a*, the UE 115 may refrain from transmitting an uplink control channel (e.g., PUCCH 310-*a*) via the second antenna panel (e.g., Panel 1). For example, the UE 115 may refrain from transmitting the PUCCH 310-*a* via the Panel 1 (e.g., drop the PUCCH 310-*a*), an example result of which is shown by the blank space above Panel 1 in the right side of FIG. 3. In other examples, having dropped PUCCH 310-*a*, the UE 115 may transmit an uplink shared channel (e.g., a PUSCH, not shown) via the second antenna panel (e.g., Panel 1) at least partially concurrently with transmitting the uplink channel via the first antenna panel (e.g., Panel 0). For example, the UE 115 may transmit a PUSCH transmission via the Panel 1 at least partially concurrently with transmitting the PUSCH 305-*b* (which may include the UCI of the PUCCH 310-*a*) via the Panel 0.

With reference to FIG. 3B, the UE may determine, based on the indication (e.g., based on the RRC parameter across-multiplexing being set to ‘disabled’), that UCI (e.g., UCI of PUCCH 310-*c*) associated with the second antenna panel (e.g., Panel 1) must be transmitted via the second antenna panel (e.g., Panel 1). In some aspects, the UE 115 may transmit the UCI associated with the second antenna panel (e.g., Panel 1) via the second antenna panel (e.g., Panel 1). In an example, the UE 115 may transmit the UCI (e.g., UCI of PUCCH 310-*c*) associated with the second antenna panel (e.g., Panel 1) within an uplink channel (e.g., a PUSCH) via the second antenna panel (e.g., Panel 1). For example, the UE 115 may transmit the UCI of PUCCH 310-*c* within a PUSCH (e.g., multiplex the UCI of PUCCH 310-*c* onto a PUSCH (not shown)) that the UE 115 may transmit via the second antenna panel (e.g., Panel 1).

In some other aspects, based on the first indication (e.g., based on the RRC parameter across-multiplexing being set to ‘enabled’) and the second indication (e.g., based on the RRC parameter ACKNACKFeedbackMode set to Separate-Feedback), the UE 115 may resolve overlapping uplink communications (e.g., a PUSCH and a PUCCH that at least partially overlap, a PUSCH and another PUSCH that at least partially overlap, a PUCCH and another PUCCH that at least partially overlap) of the same priority index (e.g., Priority 0, Priority 1) for each antenna panel (e.g., Panel 0, Panel 1) of the UE 115. Among the antenna panels, the UE 115 may select and transmit an uplink communication having the highest priority order. For example, after the UE 115 resolves the overlapping for PUCCH and/or PUSCH transmissions of the same priority index (e.g., Priority 0, Priority 1) for each panel (e.g., Panel 0, Panel 1), the UE 115 may select an uplink communication with the highest priority order based on a set of criteria.

For example, the UE 115 may select an uplink communication from among the uplink communications (e.g., candidate communications) for each panel (e.g., Panel 0, Panel 1) based on a respective priority index s, a respective antenna panel (e.g., panel identifier p) associated with each uplink communication, a respective channel type c (e.g., uplink channel type) for each uplink communication, or any combination thereof. In some aspects, the priority index s may have a value of 0 or 1, and panel identifier p may have a value of 0 or 1, and channel type c may have a value of 0 (e.g., for PUCCH) or 1 (e.g., for PUSCH).

In some aspects, in selecting an uplink communication with the highest priority order, the UE 115 may prioritize the respective priority index s for each of the uplink communications (e.g., candidate communications) over the respective antenna panel (e.g., panel identifier p) associated with each of the uplink communications (e.g., candidate communications), and the respective panel identifier p over the respective channel type c (e.g., an s, p, c order). Thus, the UE 115 may compare the respective priority indices s and select the uplink communication with the higher s value if the respective priority indices s are different. If the respective priority indices s are the same, the UE 115 proceed to compare the panel identifiers p and select the uplink communication with the higher p value if the respective panel identifiers p are different. And if the respective panel identifiers p are the same, the UE 115 proceed to compare the channel types c and select the uplink communication with the higher c value. The UE 115 thus may compare the respective s, p, and c values in priority order until a difference is identified, and the UE 115 may then select and transmit the uplink communication having the higher s, p, or c value.

In some other aspects, in selecting an uplink communication with the highest priority order, the UE 115 may prioritize the respective antenna panel (e.g., panel identifier p) associated with each of the uplink communications (e.g., candidate communications) over the respective priority index s for each of the uplink communications (e.g., candidate communications), and the respective priority index s over the respective channel type c (e.g., a p, s, c order).

And in some other aspects, in selecting an uplink communication with the highest priority order, the UE 115 may prioritize the respective priority index s for each of the uplink communications (e.g., candidate communications) over the respective channel type c (e.g., uplink channel type) for each of the uplink communications (e.g., candidate communications), and the respective channel type c over the respective antenna panel p (e.g., an s, c, p order).

Figure 4:
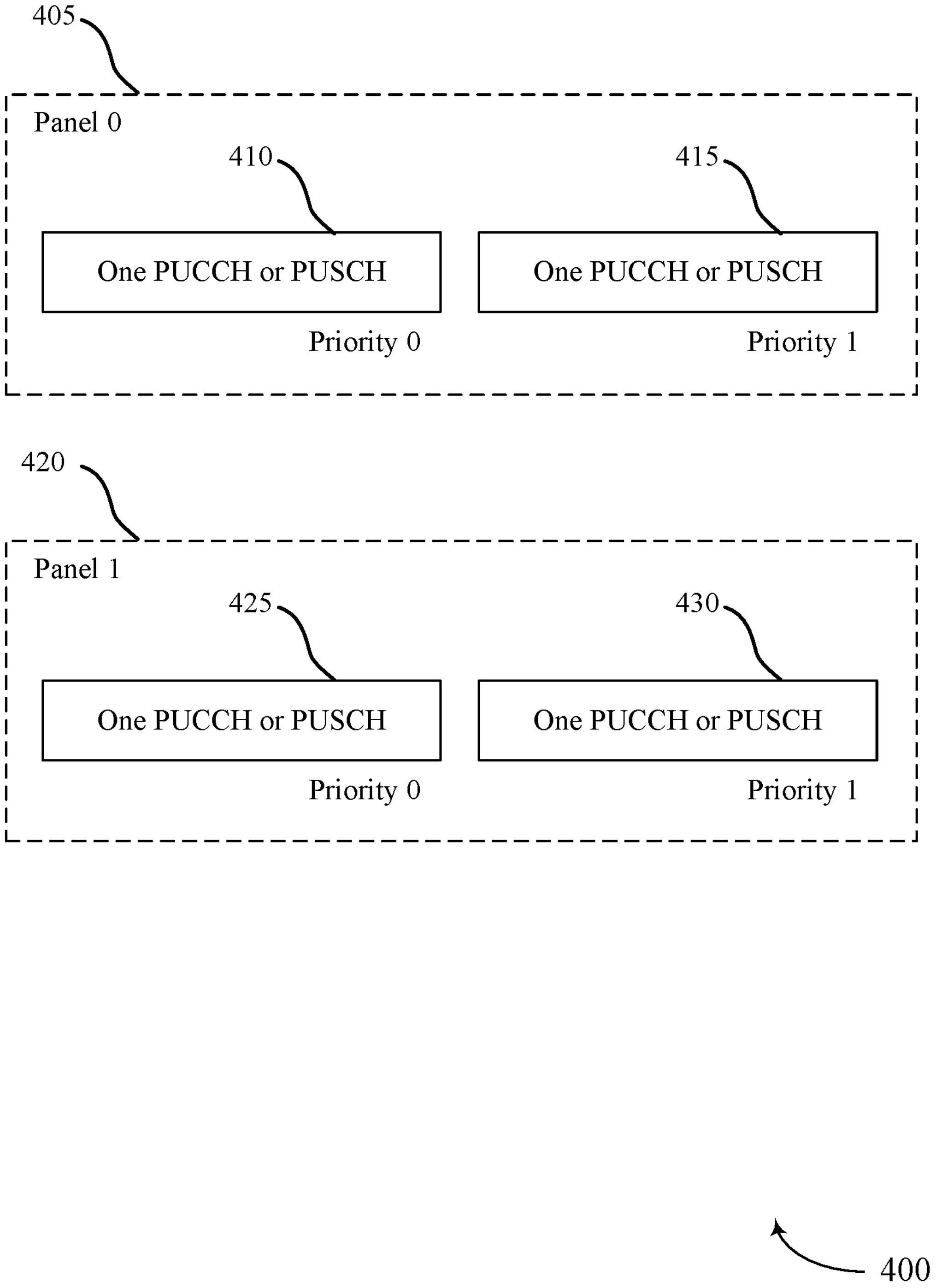
FIG. 4 illustrates an example of uplink communications via multiple antenna panels in accordance with aspects of the present disclosure.

FIG. 4 illustrates an example 400 of uplink communications via multiple antenna panels in accordance with aspects of the present disclosure. In some examples, the example 400 may be implemented by aspects of wireless communication system 100 and wireless communications system 200. Uplink communications 410 (also referred to herein as first uplink communications 410) and uplink communications 415 (also referred to herein as second uplink communications 415) may be examples of uplink communications 215-*a* or uplink communications 215-*b* as described with reference to FIG. 2. In some aspects, the uplink communications 410 and the uplink communications 415 may each be an uplink channel (e.g., PUCCH) transmission or an uplink shared channel (PUSCH) transmission. The uplink communications 410 and the uplink communications 415 may be associated with a Panel 0 of a UE 115, which may include examples of aspects of antenna panel 205-*a* or antenna panel 205-*b* described with reference to FIG. 2.

Uplink communications 425 (also referred to herein as third uplink communications 425) and uplink communications 430 (also referred to herein as fourth uplink communications 430) may be examples of uplink communications 215-*a* or uplink communications 215-*b* as described with reference to FIG. 2. In some aspects, the uplink communications 425 and the uplink communications 430 may each be an uplink channel (e.g., PUCCH) transmission or an uplink shared channel (PUSCH) transmission. The uplink communications 425 and the uplink communications 430 may be associated with a Panel 1 of a UE 115, which may include examples of aspects of antenna panel 205-*a* or antenna panel 205-*b* described with reference to FIG. 2.

With reference to FIG. 4, the UE 115 may determine, based on a first indication (e.g., based on the RRC parameter across-multiplexing being set to ‘disabled’), that UCI (e.g., UCI of a PUCCH) associated with the second antenna panel (e.g., Panel 1) must be transmitted via the second antenna panel (e.g., Panel 1). In some aspects, the determination may further be based on a second indication (e.g., based on the RRC parameter ACKNACKFeedbackMode being set to SeparateFeedback).

The UE 115 may identify, among a first set 405 of one or more uplink communications associated with the first antenna panel (e.g., Panel 0), a first uplink communication 410 having a first priority index s (e.g., Priority 0) and a second uplink communication 415 having a second priority index s (e.g., Priority 1) greater than the first priority index. The UE 115 may identify, among a second set 420 of one or more uplink communications associated with the second antenna panel (e.g., Panel 1), a third uplink communication 425 having the first priority index s (e.g., Priority 0) and a fourth uplink communication 430 having the second priority index s (e.g., Priority 1). In some aspects, the UE 115 may resolve the overlapping for PUCCH and/or PUSCH transmissions of the same priority index s (e.g., Priority 0, Priority 1) for each panel (e.g., Panel 0, Panel 1).

For example, each of the first uplink communication 410, the second uplink communication 415, the third uplink communication 425, and the fourth uplink communication may include a PUCCH (or a PUSCH) and a PUSCH (or another PUCCH) which at least partially overlap in time. In an example, the first uplink communication 410 may include a first PUCCH of a larger priority index and a PUSCH (or a second PUCCH) of a smaller priority index. The UE 115 may select and transmit the first PUCCH based on the larger priority index. In an example in which the first uplink communication 410 includes a first PUCCH of a larger priority index and a second PUCCH of a smaller priority index, the UE 115 may multiplex UCI (e.g., HARQ-ACK information, CSI reports, scheduling request) of the second PUCCH onto the first PUCCH onto the PUSCH 305-*a*.

In another example, the first uplink communication 410 may include a PUSCH of a larger priority index and a PUCCH of a smaller priority index. The UE 115 may select and transmit the PUSCH based on the larger priority index. In an example aspect, the UE 115 may multiplex UCI (e.g., HARQ-ACK information, CSI reports, scheduling request) of the PUCCH onto the PUSCH. In another example, the first uplink communication 410 may include a first PUSCH of a larger priority index and a second PUSCH of a smaller priority index. In an example aspect, the UE 115 may select and transmit the first PUSCH based on the larger priority index.

The techniques described herein with reference to the first set 405 of one or more uplink communications associated with the first antenna panel (e.g., Panel 0) may be performed by the UE 115 with reference to the second set 420 of one or more uplink communications associated with a second antenna panel (e.g., Panel 1). Once the UE 115 has selected a respective uplink communication for each priority and each panel (e.g., a priority 0 uplink communication for panel 0, a priority 1 uplink communication for panel 0, a priority 0 uplink communication for panel 1, and a priority 1 uplink communication for panel 1), the UE 115 may select, based on the techniques described herein for concurrent uplink transmissions associated with different antenna panels of the UE 115 (e.g., Panel 0, Panel 1), the UE 115 may select and transmit either a total of one uplink transmission or may select and transmit a respective uplink transmission for each panel, depending in UE 115 capabilities (e.g., the UE 115 may select one or two of the first uplink communication 410, the second uplink communication 415, the third uplink communication 425, or the fourth uplink communication 430, and then the UE 115 may transmit the one or two selected uplink communications).

Figure 5:
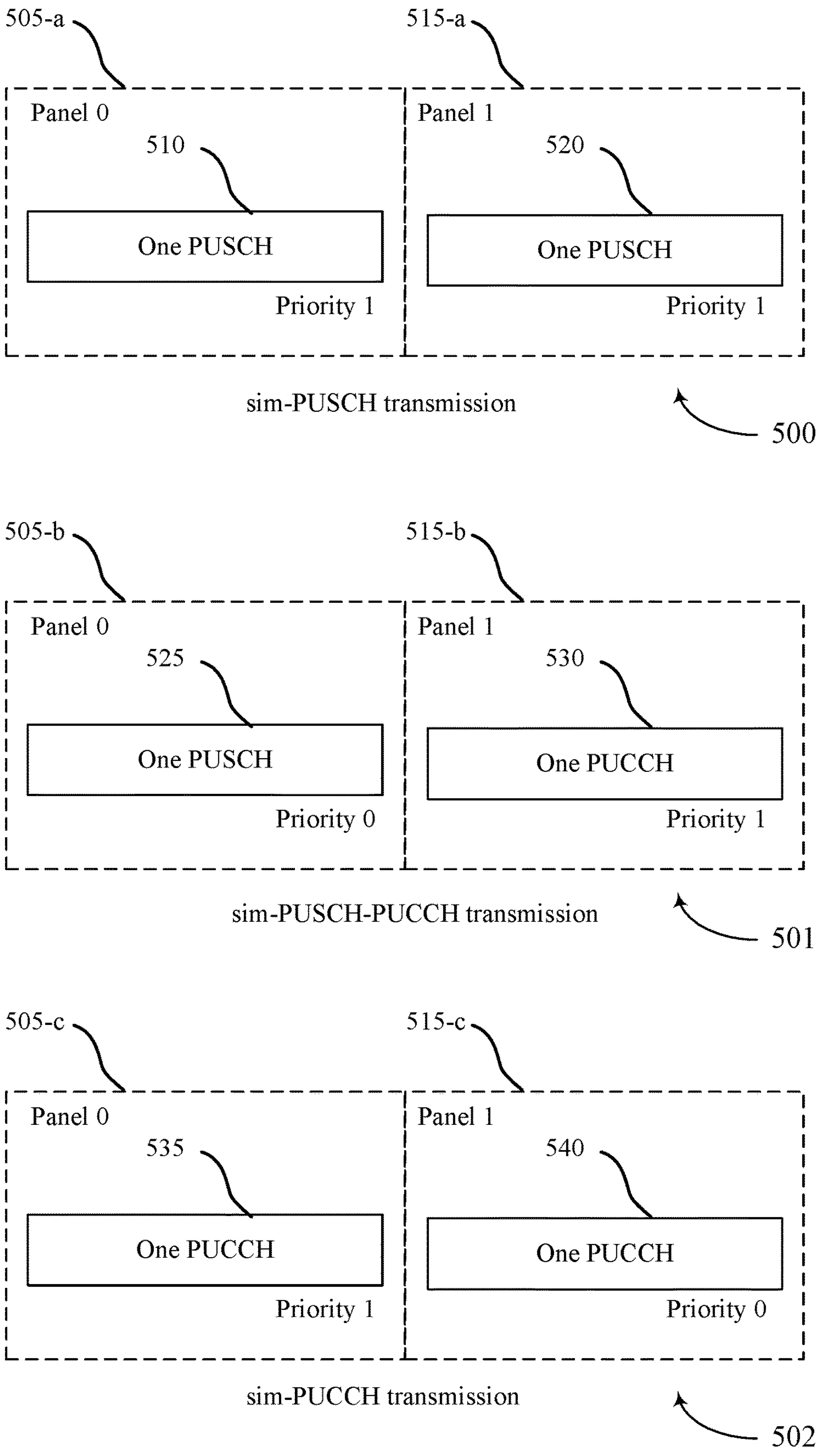
FIG. 5 illustrates an example of uplink communications via multiple antenna panels in accordance with aspects of the present disclosure.

FIG. 5 illustrates an example 500 of uplink communications via multiple antenna panels in accordance with aspects of the present disclosure. In some examples, the example 500 may be implemented by aspects of wireless communication system 100 and wireless communications system 200. In some aspects, the examples 500 through 502 may be associated with the UE 115 resolving the overlapping between PUCCH and/or PUSCH transmissions of the same priority index (e.g., Priority 0, Priority 1) for each panel (e.g., Panel 0, Panel 1), which may be themselves been identified or selected as described with reference to FIG. 4.

Example 500 illustrates an example of a simultaneous PUSCH (sim-PUSCH) transmission. In an aspect, the UE 115 may transmit PUSCHs (e.g., PUSCH 510 with Priority 1, PUSCH 520 with Priority 1) with higher priority index for each panel for cases in which the UE 115 supports sim-PUSCH transmission. For example, the UE 115 may select a highest priority PUSCH for one panel (e.g., Panel 0) and a highest priority PUSCH for the other panel (e.g., Panel 0). In some aspects, the UE 115 may transmit UCI if any (e.g., UE 115 may insert UCI of the same panel into each PUSCH).

Example 501 illustrates an example of a simultaneous PUSCH (sim-PUCCH) transmission. In an aspect, the UE 115 may transmit a PUSCH (e.g., PUSCH 525 with Priority 0) and a PUCCH (e.g., PUCCH 530 with Priority 1) with higher priority index for cases in which UE supports sim-PUCCH-PUSCH transmission. For example, the UE 115 may select a highest priority PUSCH for one panel (e.g., Panel 0) and a highest priority PUCCH for the other panel (e.g., Panel 0). In some aspects, the UE 115 may transmit UCI if any (e.g., UE 115 may insert UCI of the same panel into the PUSCH 525).

Example 502 illustrates an example of a simultaneous PUCCH (sim-PUCCH) transmission. In an aspect, the UE 115 may transmit PUCCHs with higher priority index (e.g., PUCCH 535 with Priority 1, PUCCH 540 with Priority 0) for cases in which UE supports sim-PUCCH-PUCCH transmission. For example, the UE 115 may select a highest priority PUCCH for one panel (e.g., Panel 0) and a highest priority PUCCH for the other panel (e.g., Panel 0). In some aspects, the UE 115 may transmit UCI if any (e.g., UE 115 may insert UCI of the same panel into each PUCCH).

In some aspects, the UE 115 may support one uplink communication with UCI. In such cases, for example, in which the UE 115 resolves the overlapping for PUCCH and/or PUSCH transmissions of the same priority index (e.g., Priority 0, Priority 1) for each panel (e.g., Panel 0, Panel 1), the UE 115 may select an uplink communication with the highest priority order based on a set of criteria. For example, the UE 115 may select an uplink communication from among the uplink communications (e.g., candidate communications) for each panel (e.g., Panel 0, Panel 1) based on a respective priority index s, a respective antenna panel (e.g., panel identifier p) associated with each uplink communication, a respective channel type c (e.g., uplink channel type) for each uplink communication, a respective type u of UCI associated with each uplink communication, or any combination thereof. In some aspects, the priority index s may have a value of 0 or 1, the panel identifier p may have a value of 0 or 1, the channel type c may have a value of 0 (e.g., for PUCCH) or 1 (e.g., for PUSCH), and the type u of UCI may have a value of 0 (e.g., for no UCI), 1 (e.g., for periodical or semi-persistent CSI), 2 (e.g., for aperiodic CSI reports), and 4 (e.g., for ACK/NACK).

In some aspects, in selecting an uplink communication with the highest priority order, the UE 115 may prioritize the respective priority index s for each of the uplink communications (e.g., candidate communications) over the respective type u of UCI, the respective type u of UCI over the respective panel identifier p, and the respective panel identifier p over the respective channel type c. Thus, the UE 115 may compare the respective priority indices s and select the uplink communication with the higher s value if the respective priority indices s are different. If the respective priority indices s are the same, the UE 115 proceed to compare the respective UCI types u and select the uplink communication with the higher u value if the respective UCI types u are different. The UE 115 thus may compare the respective s, u, p, and c values in priority order until a difference is identified, and the UE 115 may then select and transmit the uplink communication having the higher s, u, p, or c value.

Other options for the prioritization order are possible. For example, in some other aspects, in selecting an uplink communication with the highest priority order, the UE 115 may prioritize the respective type u of UCI for each of the uplink communications (e.g., candidate communications) over the respective priority index s, the respective priority index s over the respective panel identifier p, and the respective panel identifier p over the respective channel type c (e.g., a u, s, p, c priority order).

Figure 6:
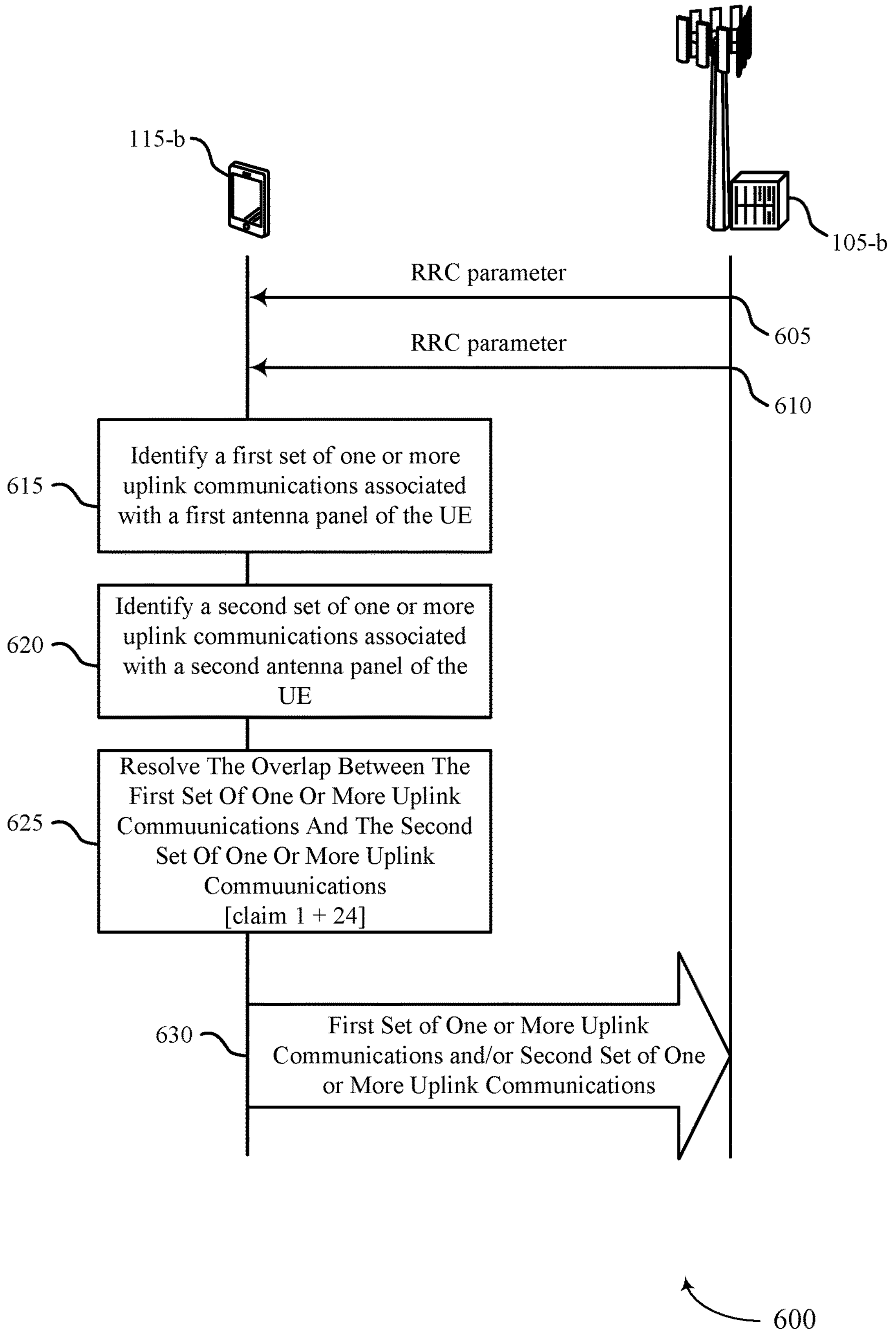
FIG. 6 illustrates an example of a process flow that supports prioritization of uplink communications via multiple antenna panels in accordance with aspects of the present disclosure.

FIG. 6 illustrates an example of a process flow 600 that supports prioritization of uplink communications via multiple antenna panels in accordance with aspects of the present disclosure. In some examples, process flow 600 may be implemented by aspects of wireless communications systems 100 or 200. Further, process flow 600 may be implemented by a UE 115-*b* and a base station 105-*b*, which may be examples of a UE 115 and a base station 105 described with reference to FIGS. 1 and 2.

In the following description of the process flow 600, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 600, or other operations may be added to the process flow 600. It is to be understood that while base station 105-*b* and UE 115-*b* are shown performing a number of the operations of process flow 600, any wireless device may perform the operations shown.

At 605, the UE 115-*b* may receive an indication of whether the UE 115-*b* is allowed to transmit UCI associated with a respective antenna panel of a set of antenna panels of the UE 115-*b* via a different antenna panel of the set of antenna panels. In some aspects, the indication may include a RRC parameter (e.g., across-multiplexing).

At 610, the UE 115-*b* may receive a second indication of a feedback mode for transmitting acknowledgement information for downlink communications associated with the first antenna panel and the second antenna panel. In some aspects, the indication may include a RRC parameter (e.g., ACKNACKFeedbackMode).

At 615, the UE 115-*b* may identify a first set of one or more uplink communications associated with a first antenna panel of the set of antenna panels of the UE 115-*b*.

At 620, the UE 115-*b* may identify a second set of one or more uplink communications associated with a second antenna panel of the set of antenna panels of the UE 115-*b*. In an example, the first set of one or more uplink communications may be scheduled to at least partially overlap in time with the second set of one or more uplink communications.

At 625, the UE 115-*b* may resolve the overlap between the first set of one or more uplink communications and the second set of one or more uplink communications based on one or more rules for concurrent uplink communications associated with different antenna panels of the set of antenna panels of the UE 115-*b*. In some aspects, the UE 115-*b* may resolve the overlap based on the indication received at 605 (e.g., radio resource control parameter across-multiplexing=enabled or disabled). In some aspects, the UE 115-*b* may resolve the overlap based on the indication received at 610 (e.g., radio resource control parameter ACKNACKFeedbackMode=SeparateFeedback or JointFeedback).

At 630, the UE 115-*b* may transmit, based on resolving the overlap, at least a portion of the first set of one or more uplink communications, at least a portion of the second set of one or more uplink communications, or a combination thereof via at least one of the first antenna panel and the second antenna panel.

Figure 7:
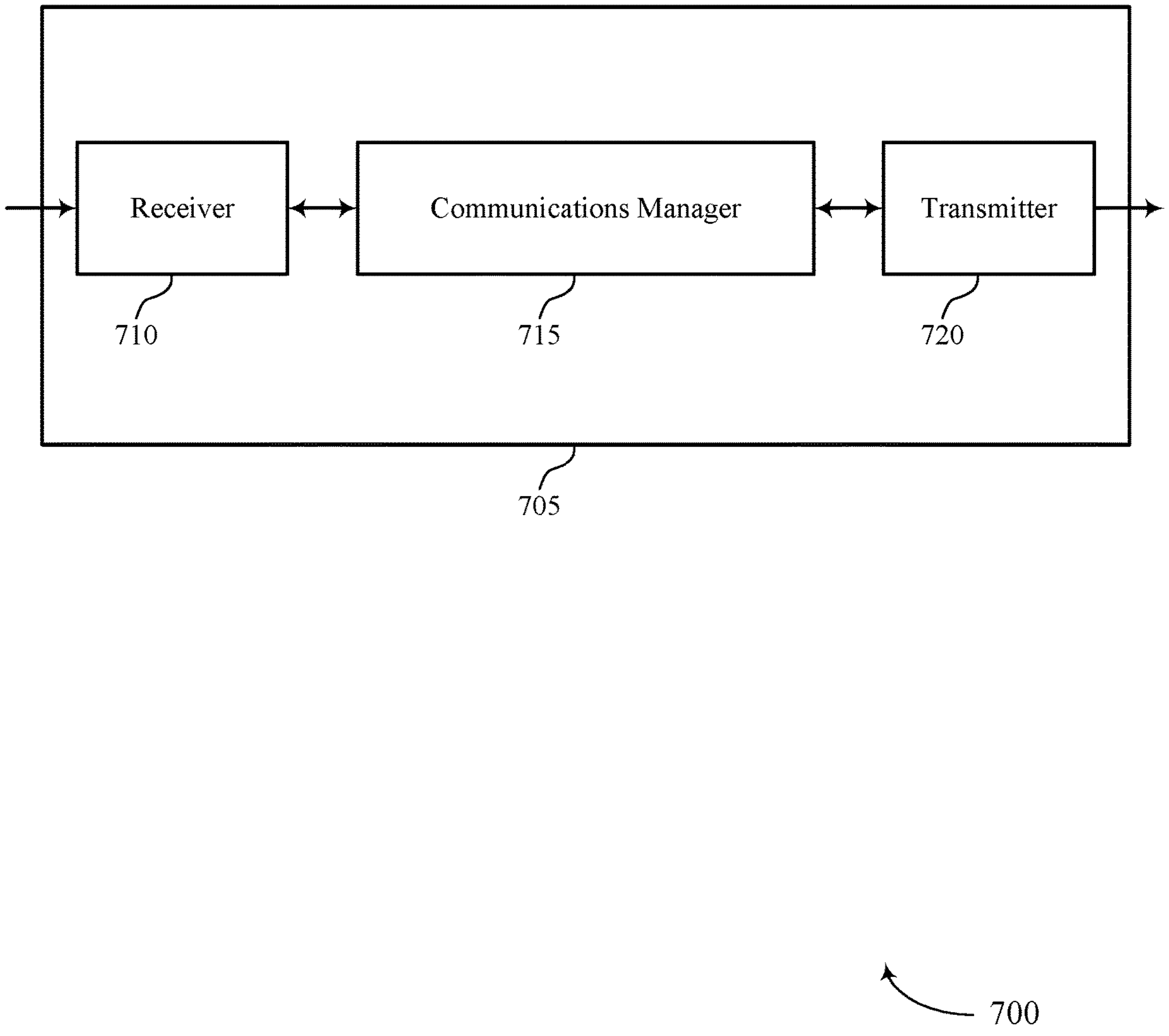
FIGS. 7 and 8 show block diagrams of devices that support prioritization of uplink communications via multiple antenna panels in accordance with aspects of the present disclosure.

FIG. 7 shows a block diagram 700 of a device 705 that supports prioritization of uplink communications via multiple antenna panels in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to prioritization of uplink communications via multiple antenna panels, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a first set of one or more uplink communications associated with a first antenna panel of a set of antenna panels of the UE, identify a second set of one or more uplink communications associated with a second antenna panel of the set of antenna panels, where the first set of one or more uplink communications are scheduled to at least partially overlap in time with the second set of one or more uplink communications, resolve the overlap between the first set of one or more uplink communications and the second set of one or more uplink communications based on one or more rules for concurrent uplink communications associated with different antenna panels of the set of antenna panels, and transmit, based on resolving the overlap, at least a portion of the first set of one or more uplink communications, at least a portion of the second set of one or more uplink communications, or a combination thereof via at least one of the first antenna panel and the second antenna panel. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
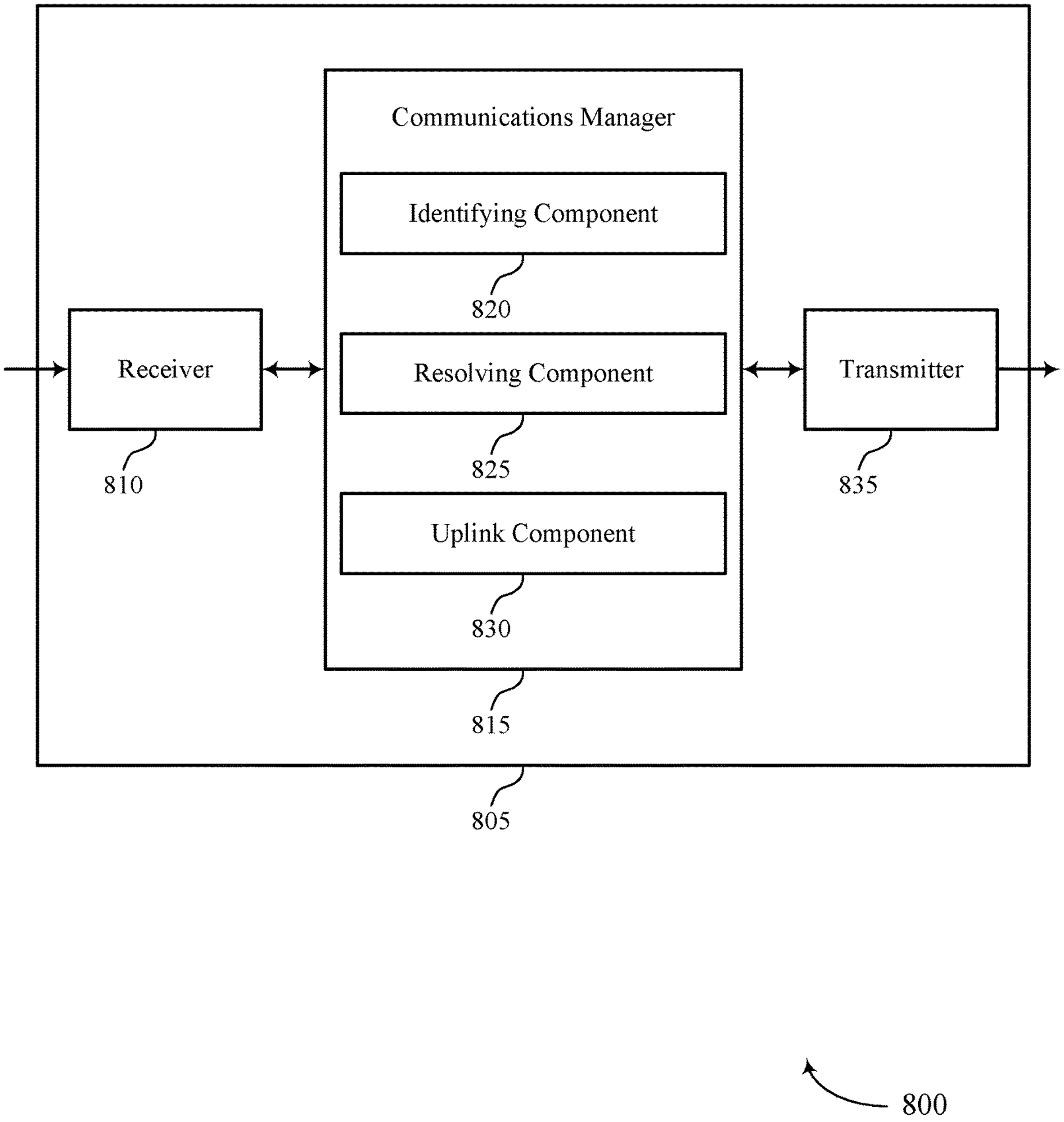

FIG. 8 shows a block diagram 800 of a device 805 that supports prioritization of uplink communications via multiple antenna panels in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to prioritization of uplink communications via multiple antenna panels, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an identifying component 820, a resolving component 825, and an uplink component 830. The communications manager 815 may be an example of aspects of the communications manager 1010 described herein.

The identifying component 820 may identify a first set of one or more uplink communications associated with a first antenna panel of a set of antenna panels of the UE, and the identifying component 820 may identify a second set of one or more uplink communications associated with a second antenna panel of the set of antenna panels, where the first set of one or more uplink communications are scheduled to at least partially overlap in time with the second set of one or more uplink communications.

The resolving component 825 may resolve the overlap between the first set of one or more uplink communications and the second set of one or more uplink communications based on one or more rules for concurrent uplink communications associated with different antenna panels of the set of antenna panels.

The uplink component 830 may transmit, based on resolving the overlap, at least a portion of the first set of one or more uplink communications, at least a portion of the second set of one or more uplink communications, or a combination thereof via at least one of the first antenna panel and the second antenna panel.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
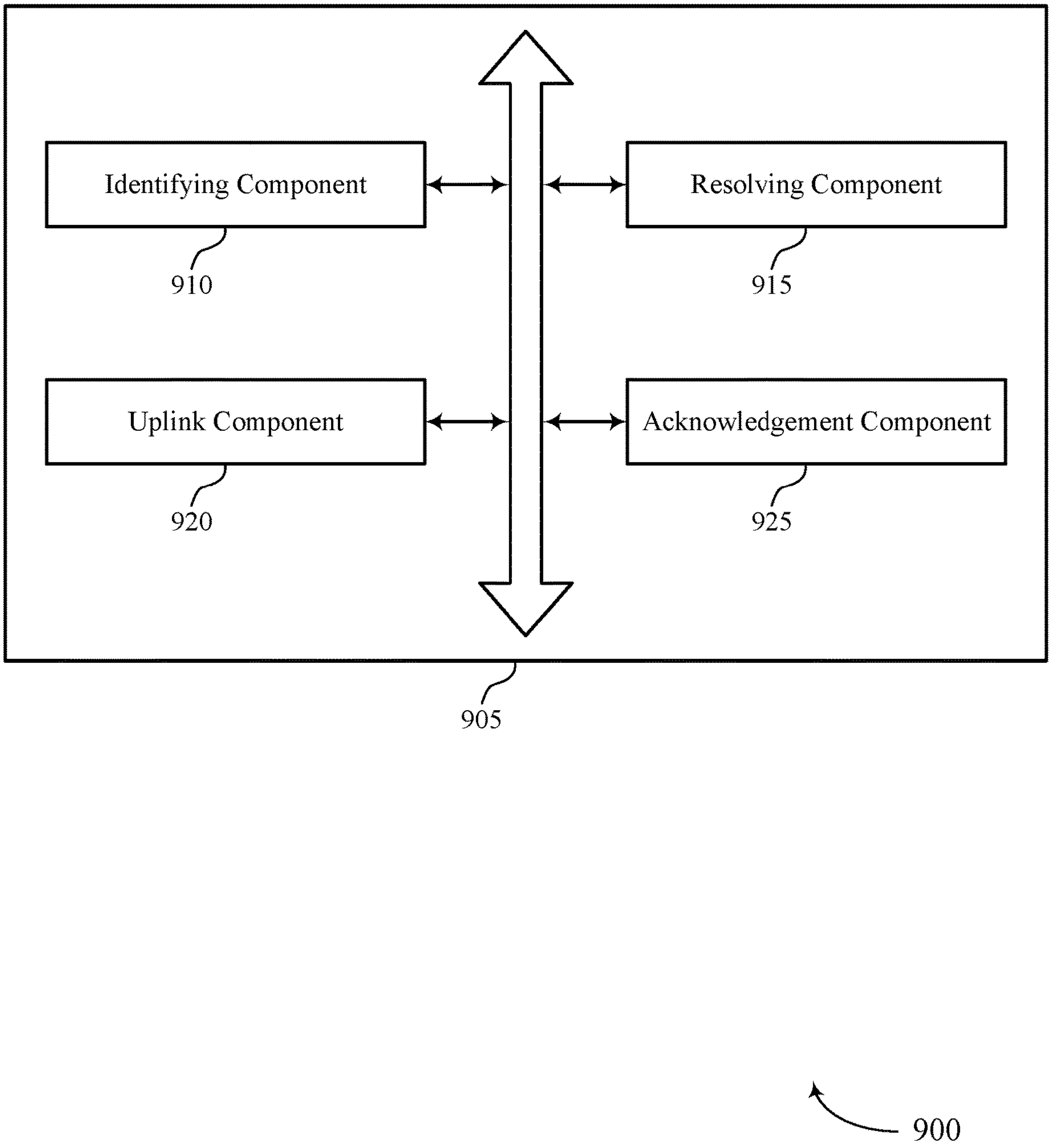
FIG. 9 shows a block diagram of a communications manager that supports prioritization of uplink communications via multiple antenna panels in accordance with aspects of the present disclosure.

FIG. 9 shows a block diagram 900 of a communications manager 905 that supports prioritization of uplink communications via multiple antenna panels in accordance with aspects of the present disclosure. The communications manager 905 may be an example of aspects of a communications manager 715, a communications manager 815, or a communications manager 1010 described herein. The communications manager 905 may include an identifying component 910, a resolving component 915, an uplink component 920, and an acknowledgement component 925. Each of these modules may communicate, directly or indirectly, with one another (e.g., via one or more buses).

The identifying component 910 may identify a first set of one or more uplink communications associated with a first antenna panel of a set of antenna panels of the UE.

In some examples, the identifying component 910 may identify a second set of one or more uplink communications associated with a second antenna panel of the set of antenna panels, where the first set of one or more uplink communications are scheduled to at least partially overlap in time with the second set of one or more uplink communications.

In some cases, the first antenna panel corresponds to a first input or output for MIMO communications by the UE.

In some cases, the second antenna panel corresponds to a second input or output for MIMO communications by the UE.

The resolving component 915 may resolve the overlap between the first set of one or more uplink communications and the second set of one or more uplink communications based on one or more rules for concurrent uplink communications associated with different antenna panels of the set of antenna panels.

In some examples, identifying the first uplink communication includes resolving, based on the one or more rules, a first overlap in time among a third set of uplink communications each associated with the first antenna panel and having the first priority index.

In some examples, identifying the second uplink communication includes resolving, based on the one or more rules, a second overlap in time among a fourth set of uplink communications each associated with the first antenna panel and having the second priority index.

In some examples, resolving the first overlap includes inserting UCI into the first uplink communication, the inserted UCI associated with an uplink control channel communication included in the third set of uplink communications.

The uplink component 920 may transmit, based on resolving the overlap, at least a portion of the first set of one or more uplink communications, at least a portion of the second set of one or more uplink communications, or a combination thereof via at least one of the first antenna panel and the second antenna panel.

In some examples, the uplink component 920 may receive an indication of whether the UE is allowed to transmit UCI associated with a respective antenna panel of the set of antenna panels via a different antenna panel of the set of antenna panels, where resolving the overlap is based on the indication.

In some examples, the uplink component 920 may determine, based on the indication, that the UE is allowed to transmit UCI associated with the second antenna panel via the first antenna panel.

In some examples, the uplink component 920 may refrain, based at least in part on transmitting uplink channel via the first antenna panel that includes the UCI associated with the second antenna panel, from transmitting an uplink control channel via the second antenna panel.

In some examples, the uplink component 920 may transmit an uplink shared channel via the second antenna panel at least partially concurrently with transmitting the uplink channel via the first antenna panel.

In some examples, the uplink component 920 may determine, based on the indication, that UCI associated with the second antenna panel must be transmitted via the second antenna panel.

In some examples, the uplink component 920 may determine, based on the indication, that UCI associated with the second antenna panel must be transmitted via the second antenna panel.

In some examples, the uplink component 920 may identify, among the first set of one or more uplink communications associated with the first antenna panel, a first uplink communication having a first priority index and a second uplink communication having a second priority index greater than the first priority index.

In some examples, the uplink component 920 may identify, among the second set of one or more uplink communications associated with the second antenna panel, a third uplink communication having the first priority index and a fourth uplink communication having the second priority index.

In some examples, the uplink component 920 may select, based on the one or more rules, an uplink communication from among a set of candidate communications that includes the first uplink communication, the second uplink communication, the third uplink communication, and the fourth uplink communication, where the transmitting includes transmitting the selected uplink communication.

In some examples, the uplink component 920 may select, from among the first uplink communication and the second uplink communication, a first uplink shared channel communication based on a priority index of the first uplink shared channel communication.

In some examples, the uplink component 920 may select, from among the third uplink communication and the fourth uplink communication, a second uplink shared channel communication based on a priority index of the second uplink shared channel communication.

In some examples, the uplink component 920 may transmit the first uplink shared channel communication via the first antenna panel.

In some examples, the uplink component 920 may transmit the second uplink shared channel communication via the second antenna panel.

In some examples, the uplink component 920 may select, from among the first uplink communication and the second uplink communication, an uplink shared channel communication based on a priority index of the uplink shared channel communication.

In some examples, the uplink component 920 may select, from among the third uplink communication and the fourth uplink communication, an uplink control channel communication based on a priority index of the uplink control channel communication.

In some examples, the uplink component 920 may transmit the uplink shared channel communication via the first antenna panel.

In some examples, the uplink component 920 may transmit the uplink control channel communication via the second antenna panel.

In some examples, the uplink component 920 may select, from among the first uplink communication and the second uplink communication, a first uplink control channel communication based on a priority index of the first uplink control channel communication.

In some examples, the uplink component 920 may select, from among the third uplink communication and the fourth uplink communication, a second uplink control channel communication based on a priority index of the second uplink control channel communication.

In some examples, the uplink component 920 may transmit the first uplink control channel communication via the first antenna panel.

In some examples, the uplink component 920 may transmit the second uplink control channel communication via the second antenna panel.

In some examples, the uplink component 920 may receive an indication that UCI associated with a respective antenna panel of the set of antenna panels may be transmitted via a different antenna panel of the set of antenna panels.

In some examples, the uplink component 920 may select, based on the indication and the one or more rules, an uplink communication from among a set of candidate communications that includes the first uplink communication, the second uplink communication, the third uplink communication, and the fourth uplink communication.

In some cases, the first uplink communication includes an uplink shared channel communication. In some cases, the first uplink shared channel communication includes UCI associated with the first antenna panel. In some cases, the second uplink shared channel communication includes UCI associated with the first antenna panel. In some cases, the uplink shared channel communication includes UCI associated with the first antenna panel.

In some cases, the uplink component 920 may select an uplink communication based on a respective priority index for each candidate communication of the set of candidate communications, a respective antenna panel associated with each candidate communication of the set of candidate communications, a respective channel type for each candidate communication of the set of candidate communications, a respective type of UCI associated with each candidate communication of the set of candidate communications, or any combination thereof.

In some cases, the selecting results in a single selected uplink communication.

In some cases, the indication of whether the UE is allowed to transmit the UCI associated with the respective antenna panel of the set of antenna panels via the different antenna panel of the set of antenna panels includes a radio resource control parameter.

In some cases, the selecting is based on a respective priority index for each candidate communication of the set of candidate communications, a respective antenna panel associated with each candidate communication of the set of candidate communications, a respective channel type for each candidate communication of the set of candidate communications, or any combination thereof.

In some cases, the selected uplink communication includes the UCI associated with the respective antenna panel.

In some cases, the transmitting includes transmitting the selected uplink communication via the different antenna panel.

In some cases, the uplink component 920 may prioritize the respective priority index for each candidate communication of the set of candidate communications over the respective type of UCI associated with each candidate communication of the set of candidate communications as part of the selecting.

In some cases, the uplink component 920 may prioritize the respective type of UCI associated with each candidate communication of the set of candidate communications over the respective priority index for each candidate communication of the set of candidate communications as part of the selecting.

In some cases, the uplink component 920 may prioritize the respective priority index for each candidate communication of the set of candidate communications over the respective antenna panel associated with each candidate communication of the set of candidate communications as part of the selecting.

In some cases, the uplink component 920 may prioritize the respective antenna panel associated with each candidate communication of the set of candidate communications over the respective priority index for each candidate communication of the set of candidate communications as part of the selecting.

In some cases, the uplink component 920 may prioritize the respective channel type for each candidate communication of the set of candidate communications over the respective antenna panel associated with each candidate communication of the set of candidate communications as part of the selecting.

The acknowledgement component 925 may receive a second indication of a feedback mode for transmitting acknowledgement information for downlink communications associated with the first antenna panel and the second antenna panel, where resolving the overlap is based on the second indication.

Figure 10:
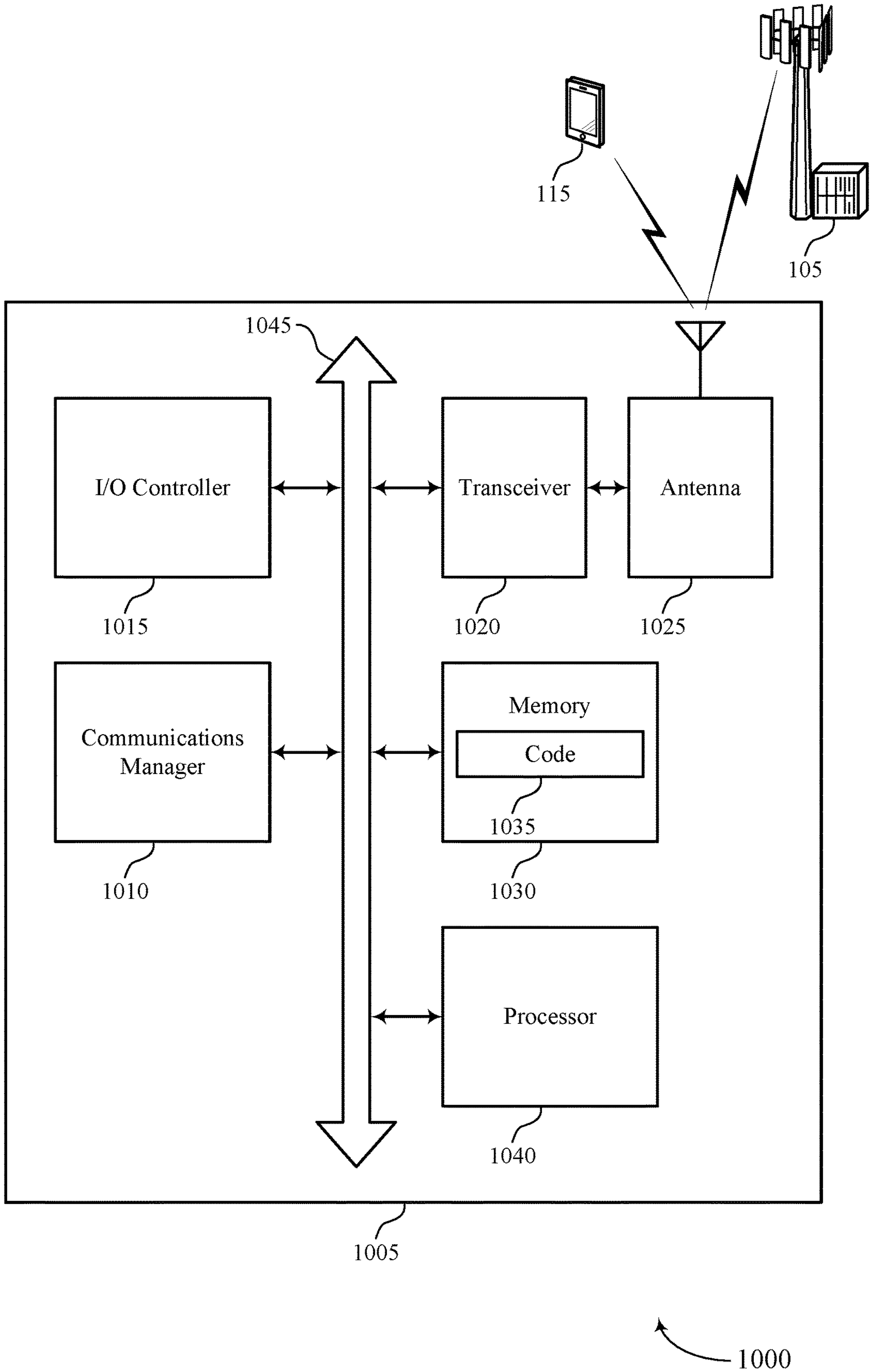
FIG. 10 shows a diagram of a system including a device that supports prioritization of uplink communications via multiple antenna panels in accordance with aspects of the present disclosure.

FIG. 10 shows a diagram of a system 1000 including a device 1005 that supports prioritization of uplink communications via multiple antenna panels in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a first set of one or more uplink communications associated with a first antenna panel of a set of antenna panels of the UE, identify a second set of one or more uplink communications associated with a second antenna panel of the set of antenna panels, where the first set of one or more uplink communications are scheduled to at least partially overlap in time with the second set of one or more uplink communications, resolve the overlap between the first set of one or more uplink communications and the second set of one or more uplink communications based on one or more rules for concurrent uplink communications associated with different antenna panels of the set of antenna panels, and transmit, based on resolving the overlap, at least a portion of the first set of one or more uplink communications, at least a portion of the second set of one or more uplink communications, or a combination thereof via at least one of the first antenna panel and the second antenna panel.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting prioritization of uplink communications via multiple antenna panels).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
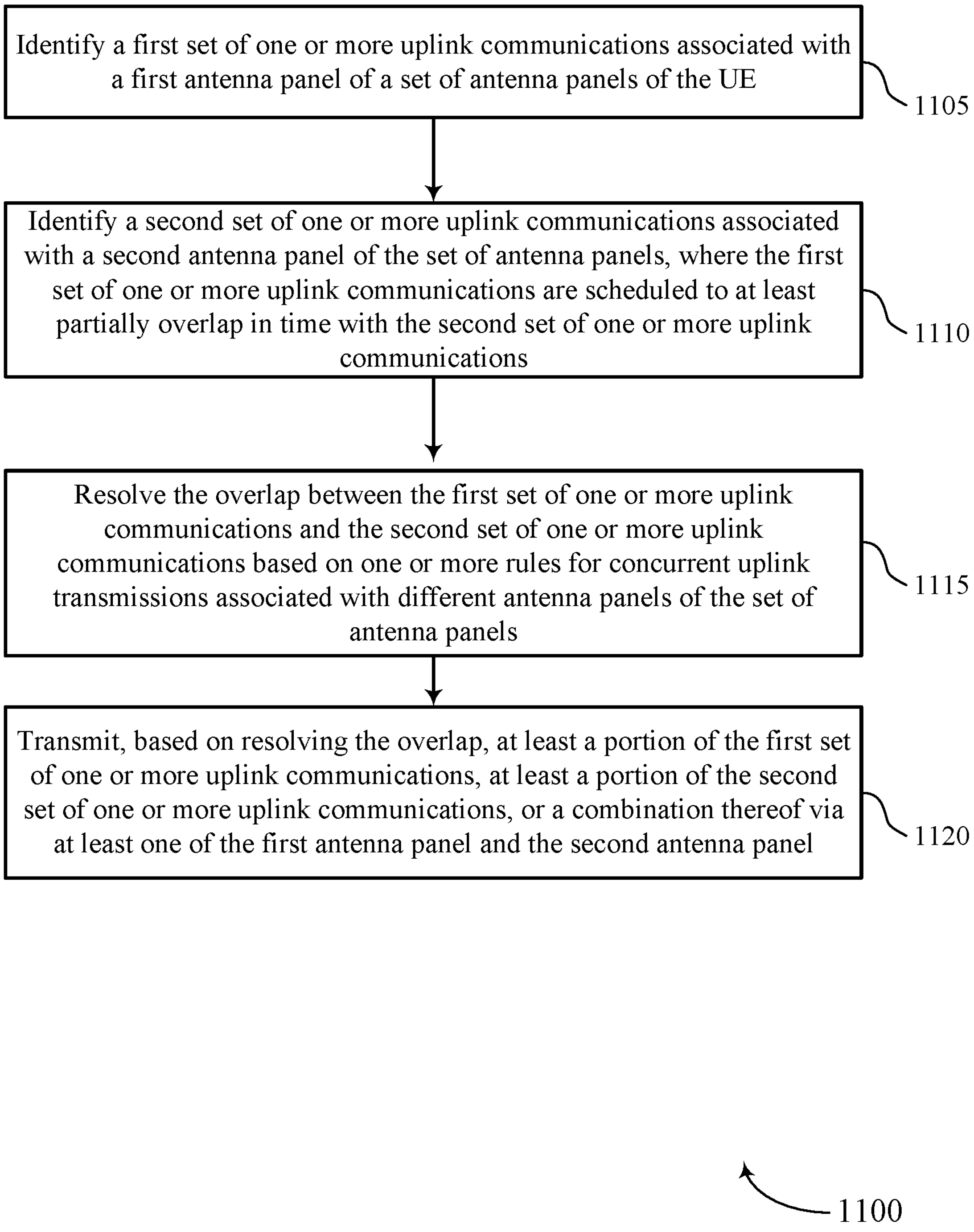
FIGS. 11 through 13 show flowcharts illustrating methods that support prioritization of uplink communications via multiple antenna panels in accordance with aspects of the present disclosure.

FIG. 11 shows a flowchart illustrating a method 1100 that supports prioritization of uplink communications via multiple antenna panels in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may identify a first set of one or more uplink communications associated with a first antenna panel of a set of antenna panels of the UE. The operations of 1105 may be performed according to the methods described herein. In some examples, aspects of the operations of 1105 may be performed by an identifying component as described with reference to FIGS. 7 through 10. Additionally or alternatively, means for performing 1105 may, but not necessarily, include, for example, antenna 1025, transceiver 1020, communications manager 1010, memory 1030 (including code 1035), processor 1040 and/or bus 1045.

At 1110, the UE may identify a second set of one or more uplink communications associated with a second antenna panel of the set of antenna panels, where the first set of one or more uplink communications are scheduled to at least partially overlap in time with the second set of one or more uplink communications. The operations of 1110 may be performed according to the methods described herein. In some examples, aspects of the operations of 1110 may be performed by an identifying component as described with reference to FIGS. 7 through 10. Additionally or alternatively, means for performing 1110 may, but not necessarily, include, for example, antenna 1025, transceiver 1020, communications manager 1010, memory 1030 (including code 1035), processor 1040 and/or bus 1045.

At 1115, the UE may resolve the overlap between the first set of one or more uplink communications and the second set of one or more uplink communications based on one or more rules for concurrent uplink communications associated with different antenna panels of the set of antenna panels. The operations of 1115 may be performed according to the methods described herein. In some examples, aspects of the operations of 1115 may be performed by a resolving component as described with reference to FIGS. 7 through 10. Additionally or alternatively, means for performing 1115 may, but not necessarily, include, for example, antenna 1025, transceiver 1020, communications manager 1010, memory 1030 (including code 1035), processor 1040 and/or bus 1045.

At 1120, the UE may transmit, based on resolving the overlap, at least a portion of the first set of one or more uplink communications, at least a portion of the second set of one or more uplink communications, or a combination thereof via at least one of the first antenna panel and the second antenna panel. The operations of 1120 may be performed according to the methods described herein. In some examples, aspects of the operations of 1120 may be performed by an uplink component as described with reference to FIGS. 7 through 10. Additionally or alternatively, means for performing 1120 may, but not necessarily, include, for example, antenna 1025, transceiver 1020, communications manager 1010, memory 1030 (including code 1035), processor 1040 and/or bus 1045.

Figure 12:
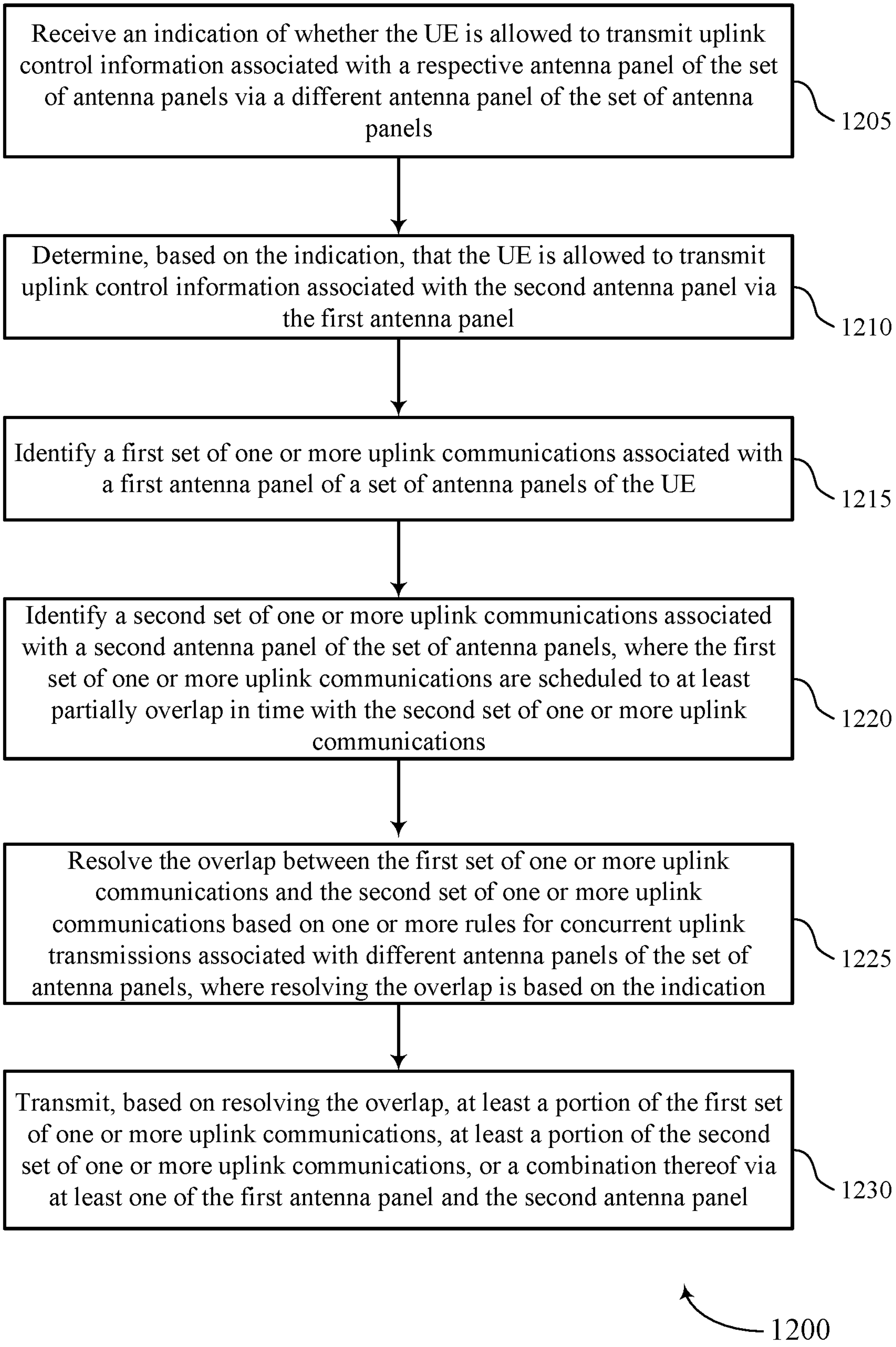

FIG. 12 shows a flowchart illustrating a method 1200 that supports prioritization of uplink communications via multiple antenna panels in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive an indication of whether the UE is allowed to transmit UCI associated with a respective antenna panel of the set of antenna panels via a different antenna panel of the set of antenna panels. The operations of 1205 may be performed according to the methods described herein. In some examples, aspects of the operations of 1205 may be performed by an uplink component as described with reference to FIGS. 7 through 10. Additionally or alternatively, means for performing 1205 may, but not necessarily, include, for example, antenna 1025, transceiver 1020, communications manager 1010, memory 1030 (including code 1035), processor 1040 and/or bus 1045.

At 1210, the UE may determine, based on the indication, that the UE is allowed to transmit UCI associated with the second antenna panel via the first antenna panel. The operations of 1210 may be performed according to the methods described herein. In some examples, aspects of the operations of 1210 may be performed by an uplink component as described with reference to FIGS. 7 through 10. Additionally or alternatively, means for performing 1210 may, but not necessarily, include, for example, antenna 1025, transceiver 1020, communications manager 1010, memory 1030 (including code 1035), processor 1040 and/or bus 1045.

At 1215, the UE may identify a first set of one or more uplink communications associated with a first antenna panel of a set of antenna panels of the UE. The operations of 1215 may be performed according to the methods described herein. In some examples, aspects of the operations of 1215 may be performed by an identifying component as described with reference to FIGS. 7 through 10. Additionally or alternatively, means for performing 1215 may, but not necessarily, include, for example, antenna 1025, transceiver 1020, communications manager 1010, memory 1030 (including code 1035), processor 1040 and/or bus 1045.

At 1220, the UE may identify a second set of one or more uplink communications associated with a second antenna panel of the set of antenna panels, where the first set of one or more uplink communications are scheduled to at least partially overlap in time with the second set of one or more uplink communications. The operations of 1220 may be performed according to the methods described herein. In some examples, aspects of the operations of 1220 may be performed by an identifying component as described with reference to FIGS. 7 through 10. Additionally or alternatively, means for performing 1220 may, but not necessarily, include, for example, antenna 1025, transceiver 1020, communications manager 1010, memory 1030 (including code 1035), processor 1040 and/or bus 1045.

At 1225, the UE may resolve the overlap between the first set of one or more uplink communications and the second set of one or more uplink communications based on one or more rules for concurrent uplink communications associated with different antenna panels of the set of antenna panels, where resolving the overlap is based on the indication received at 1205 (e.g., based on the related determining at 1210). The operations of 1225 may be performed according to the methods described herein. In some examples, aspects of the operations of 1225 may be performed by a resolving component as described with reference to FIGS. 7 through 10. Additionally or alternatively, means for performing 1225 may, but not necessarily, include, for example, antenna 1025, transceiver 1020, communications manager 1010, memory 1030 (including code 1035), processor 1040 and/or bus 1045.

At 1230, the UE may transmit, based on resolving the overlap, at least a portion of the first set of one or more uplink communications, at least a portion of the second set of one or more uplink communications, or a combination thereof via at least one of the first antenna panel and the second antenna panel. The operations of 1230 may be performed according to the methods described herein. In some examples, aspects of the operations of 1230 may be performed by an uplink component as described with reference to FIGS. 7 through 10. Additionally or alternatively, means for performing 1230 may, but not necessarily, include, for example, antenna 1025, transceiver 1020, communications manager 1010, memory 1030 (including code 1035), processor 1040 and/or bus 1045.

Figure 13:
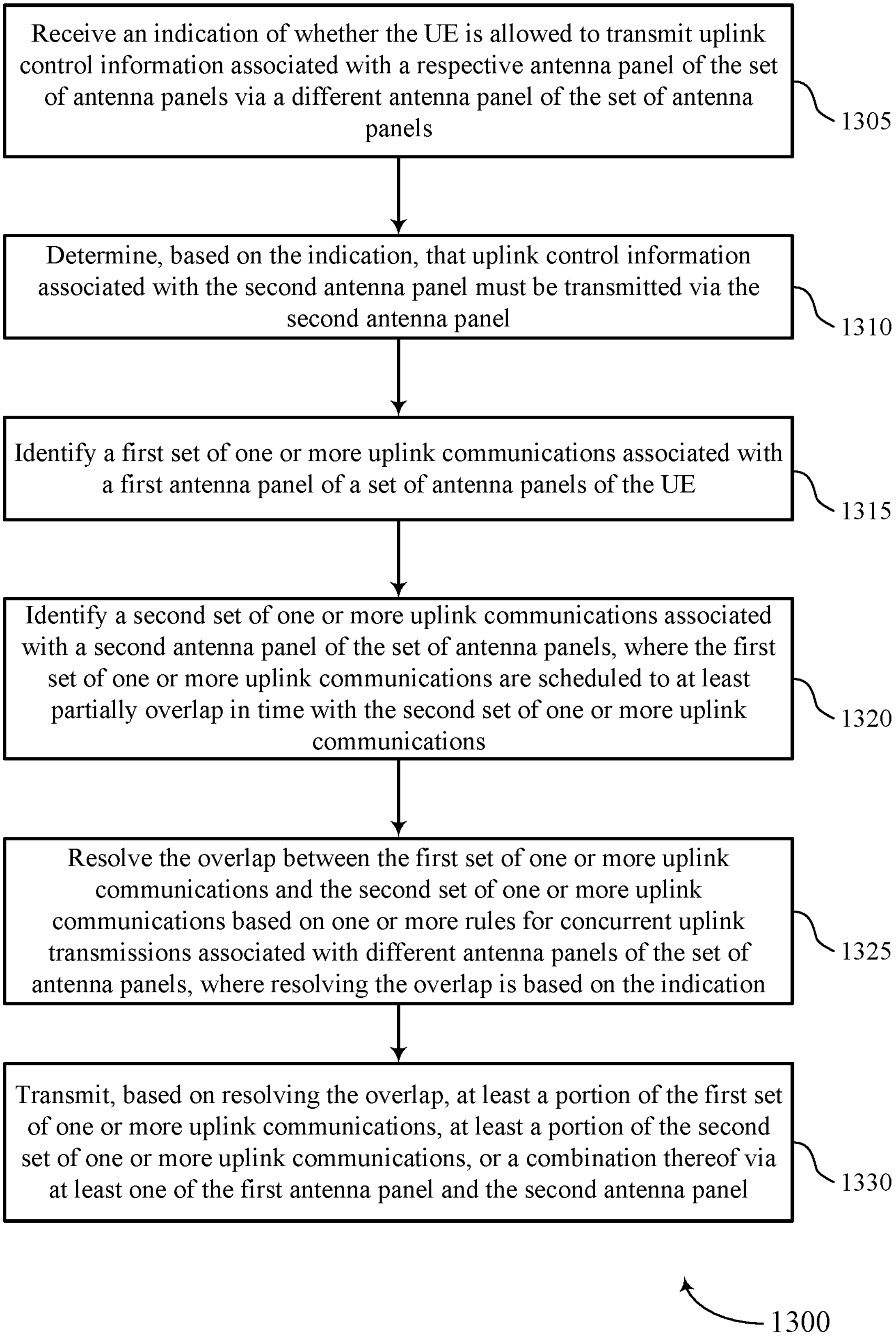

FIG. 13 shows a flowchart illustrating a method 1300 that supports prioritization of uplink communications via multiple antenna panels in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may receive an indication of whether the UE is allowed to transmit UCI associated with a respective antenna panel of the set of antenna panels via a different antenna panel of the set of antenna panels. The operations of 1305 may be performed according to the methods described herein. In some examples, aspects of the operations of 1305 may be performed by an uplink component as described with reference to FIGS. 7 through 10. Additionally or alternatively, means for performing 1305 may, but not necessarily, include, for example, antenna 1025, transceiver 1020, communications manager 1010, memory 1030 (including code 1035), processor 1040 and/or bus 1045.

At 1310, the UE may determine, based on the indication, that UCI associated with the second antenna panel must be transmitted via the second antenna panel. The operations of 1310 may be performed according to the methods described herein. In some examples, aspects of the operations of 1310 may be performed by an uplink component as described with reference to FIGS. 7 through 10. Additionally or alternatively, means for performing 1310 may, but not necessarily, include, for example, antenna 1025, transceiver 1020, communications manager 1010, memory 1030 (including code 1035), processor 1040 and/or bus 1045.

At 1315, the UE may identify a first set of one or more uplink communications associated with a first antenna panel of a set of antenna panels of the UE. The operations of 1315 may be performed according to the methods described herein. In some examples, aspects of the operations of 1315 may be performed by an identifying component as described with reference to FIGS. 7 through 10. Additionally or alternatively, means for performing 1315 may, but not necessarily, include, for example, antenna 1025, transceiver 1020, communications manager 1010, memory 1030 (including code 1035), processor 1040 and/or bus 1045.

At 1320, the UE may identify a second set of one or more uplink communications associated with a second antenna panel of the set of antenna panels, where the first set of one or more uplink communications are scheduled to at least partially overlap in time with the second set of one or more uplink communications. The operations of 1320 may be performed according to the methods described herein. In some examples, aspects of the operations of 1320 may be performed by an identifying component as described with reference to FIGS. 7 through 10. Additionally or alternatively, means for performing 1320 may, but not necessarily, include, for example, antenna 1025, transceiver 1020, communications manager 1010, memory 1030 (including code 1035), processor 1040 and/or bus 1045.

At 1325, the UE may resolve the overlap between the first set of one or more uplink communications and the second set of one or more uplink communications based on one or more rules for concurrent uplink communications associated with different antenna panels of the set of antenna panels, where resolving the overlap is based on the indication received at 1305 (e.g., based on the related determining at 1310). The operations of 1325 may be performed according to the methods described herein. In some examples, aspects of the operations of 1325 may be performed by a resolving component as described with reference to FIGS. 7 through 10. Additionally or alternatively, means for performing 1325 may, but not necessarily, include, for example, antenna 1025, transceiver 1020, communications manager 1010, memory 1030 (including code 1035), processor 1040 and/or bus 1045.

At 1330, the UE may transmit, based on resolving the overlap, at least a portion of the first set of one or more uplink communications, at least a portion of the second set of one or more uplink communications, or a combination thereof via at least one of the first antenna panel and the second antenna panel. The operations of 1330 may be performed according to the methods described herein. In some examples, aspects of the operations of 1330 may be performed by an uplink component as described with reference to FIGS. 7 through 10. Additionally or alternatively, means for performing 1330 may, but not necessarily, include, for example, antenna 1025, transceiver 1020, communications manager 1010, memory 1030 (including code 1035), processor 1040 and/or bus 1045.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving an indication of a feedback mode for transmitting acknowledgement information for downlink communications associated with a first antenna panel of a set of antenna panels of the UE and a second antenna panel of the set of antenna panels;

identifying a first set of one or more uplink communications associated with the first antenna panel;

identifying a second set of one or more uplink communications associated with the second antenna panel, wherein the first set of one or more uplink communications are scheduled to at least partially overlap in time with the second set of one or more uplink communications;

resolving the overlap between the first set of one or more uplink communications and the second set of one or more uplink communications based at least in part on one or more rules for concurrent uplink communications associated with different antenna panels of the set of antenna panels and the indication of the feedback mode; and transmitting, based at least in part on resolving the overlap, at least a portion of the first set of one or more uplink communications, at least a portion of the second set of one or more uplink communications, or a combination thereof via at least one of the first antenna panel and the second antenna panel.

2. The method of claim 1, further comprising:

receiving a cross-multiplexing indication that indicates whether the UE is allowed to transmit uplink control information associated with the second antenna panel via the first antenna panel, wherein resolving the overlap is further based at least in part on the cross-multiplexing indication.

3. The method of claim 2, further comprising:

determining, based at least in part on the cross-multiplexing indication, that the UE is allowed to transmit uplink control information associated with the second antenna panel via the first antenna panel, wherein the transmitting comprises:

transmitting, via the first antenna panel, an uplink channel that includes the uplink control information associated with the second antenna panel.

4. The method of claim 3, wherein the transmitting further comprises:

refraining, based at least in part on transmitting the uplink channel via the first antenna panel that includes the uplink control information associated with the second antenna panel, from transmitting an uplink control channel via the second antenna panel.

5. The method of claim 3, wherein the transmitting further comprises:

transmitting an uplink shared channel via the second antenna panel at least partially concurrently with transmitting the uplink channel via the first antenna panel.

6. The method of claim 2, further comprising:

determining, based at least in part on the cross-multiplexing indication, that uplink control information associated with the second antenna panel must be transmitted via the second antenna panel;

identifying, among the first set of one or more uplink communications associated with the first antenna panel, a first uplink communication having a first priority index and a second uplink communication having a second priority index greater than the first priority index;

identifying, among the second set of one or more uplink communications associated with the second antenna panel, a third uplink communication having the first priority index and a fourth uplink communication having the second priority index; and selecting, based at least in part on the one or more rules, an uplink communication from among a set of candidate communications that comprises the first uplink communication, the second uplink communication, the third uplink communication, and the fourth uplink communication, wherein the transmitting comprises transmitting the selected uplink communication.

7. The method of claim 6, wherein:

identifying the first uplink communication comprises resolving, based at least in part on the one or more rules, a first overlap in time among a third set of uplink communications each associated with the first antenna panel and having the first priority index; and identifying the second uplink communication comprises resolving, based at least in part on the one or more rules, a second overlap in time among a fourth set of uplink communications each associated with the first antenna panel and having the second priority index.

8. The method of claim 7, wherein:

the first uplink communication comprises an uplink shared channel communication; and resolving the first overlap comprises inserting uplink control information into the first uplink communication, the inserted uplink control information associated with an uplink control channel communication included in the third set of uplink communications.

9. The method of claim 6, wherein:

the selecting comprises:

selecting, from among the first uplink communication and the second uplink communication, a first uplink shared channel communication based at least in part on a priority index of the first uplink shared channel communication; and selecting, from among the third uplink communication and the fourth uplink communication, a second uplink shared channel communication based at least in part on a priority index of the second uplink shared channel communication; and the transmitting comprises:

transmitting the first uplink shared channel communication via the first antenna panel; and transmitting the second uplink shared channel communication via the second antenna panel.

10. The method of claim 9, wherein:

the first uplink shared channel communication comprises uplink control information associated with the first antenna panel; or the second uplink shared channel communication comprises the uplink control information associated with the first antenna panel.

11. The method of claim 6, wherein:

the selecting comprises:

selecting, from among the first uplink communication and the second uplink communication, an uplink shared channel communication based at least in part on a priority index of the uplink shared channel communication; and selecting, from among the third uplink communication and the fourth uplink communication, an uplink control channel communication based at least in part on a priority index of the uplink control channel communication; and the transmitting comprises:

transmitting the uplink shared channel communication via the first antenna panel; and transmitting the uplink control channel communication via the second antenna panel.

12. The method of claim 11, wherein the uplink shared channel communication comprises uplink control information associated with the first antenna panel.

13. The method of claim 6, wherein:

the selecting comprises:

selecting, from among the first uplink communication and the second uplink communication, a first uplink control channel communication based at least in part on a priority index of the first uplink control channel communication; and selecting, from among the third uplink communication and the fourth uplink communication, a second uplink control channel communication based at least in part on a priority index of the second uplink control channel communication; and the transmitting comprises:

transmitting the first uplink control channel communication via the first antenna panel; and transmitting the second uplink control channel communication via the second antenna panel.

14. The method of claim 6, wherein the selecting is based at least in part on a respective priority index for each candidate communication of the set of candidate communications, a respective antenna panel associated with each candidate communication of the set of candidate communications, a respective channel type for each candidate communication of the set of candidate communications, a respective type of uplink control information associated with each candidate communication of the set of candidate communications, or any combination thereof.

15. The method of claim 14, wherein the selecting prioritizes the respective priority index for each candidate communication of the set of candidate communications over the respective type of uplink control information associated with each candidate communication of the set of candidate communications.

16. The method of claim 14, wherein the selecting prioritizes the respective type of uplink control information associated with each candidate communication of the set of candidate communications over the respective priority index for each candidate communication of the set of candidate communications.

17. The method of claim 14, wherein the selecting results in a single selected uplink communication.

18. The method of claim 2, wherein the cross-multiplexing indication that indicates whether the UE is allowed to transmit the uplink control information associated with the second antenna panel via the first antenna panel comprises a radio resource control parameter.

19. The method of claim 1, further comprising:

determining that uplink control information associated with the second antenna panel must be transmitted via the second antenna panel, wherein the transmitting comprises:

transmitting the uplink control information associated with the second antenna panel within an uplink channel via the second antenna panel.

20. The method of claim 1, further comprising:

receiving a cross-multiplexing indication that uplink control information associated with the second antenna panel may be transmitted via the first antenna panel;

identifying, among the first set of one or more uplink communications associated with the first antenna panel, a first uplink communication having a first priority index and a second uplink communication having a second priority index greater than the first priority index;

identifying, among the second set of one or more uplink communications associated with the second antenna panel, a third uplink communication having the first priority index and a fourth uplink communication having the second priority index; and selecting, based at least in part on the cross-multiplexing indication and the one or more rules, an uplink communication from among a set of candidate communications that comprises the first uplink communication, the second uplink communication, the third uplink communication, and the fourth uplink communication, wherein;

the selecting is based at least in part on a respective priority index for each candidate communication of the set of candidate communications, a respective antenna panel associated with each candidate communication of the set of candidate communications, a respective channel type for each candidate communication of the set of candidate communications, or any combination thereof;

the selected uplink communication comprises the uplink control information associated with the respective antenna panel; and the transmitting comprises transmitting the selected uplink communication via the different antenna panel.

21. The method of claim 20, wherein the selecting prioritizes the respective priority index for each candidate communication of the set of candidate communications over the respective antenna panel associated with each candidate communication of the set of candidate communications.

22. The method of claim 20, wherein the selecting prioritizes the respective antenna panel associated with each candidate communication of the set of candidate communications over the respective priority index for each candidate communication of the set of candidate communications.

23. The method of claim 20, wherein the selecting prioritizes the respective channel type for each candidate communication of the set of candidate communications over the respective antenna panel associated with each candidate communication of the set of candidate communications.

24. The method of claim 1, wherein:

the first antenna panel corresponds to a first input or output for multiple-input and multiple-output (MIMO) communications by the UE; and the second antenna panel corresponds to a second input or output for MIMO communications by the UE.

25. An apparatus for wireless communication comprising:

memory;

a transceiver; and at least one processor of a user equipment (UE), the at least one processor coupled with the memory and the transceiver, and the at least one processor configured to cause the apparatus to:

receive an indication of a feedback mode for transmitting acknowledgement information for downlink communications associated with a first antenna panel of a set of antenna panels of the UE and a second antenna panel of the set of antenna panels;

identify a first set of one or more uplink communications associated with the first antenna panel;

identify a second set of one or more uplink communications associated with the second antenna panel, wherein the first set of one or more uplink communications are scheduled to at least partially overlap in time with the second set of one or more uplink communications;

resolve the overlap between the first set of one or more uplink communications and the second set of one or more uplink communications based at least in part on one or more rules for concurrent uplink communications associated with different antenna panels of the set of antenna panels and the indication of the feedback mode; and transmit, via the transceiver and based at least in part on resolving the overlap, at least a portion of the first set of one or more uplink communications, at least a portion of the second set of one or more uplink communications, or a combination thereof via at least one of the first antenna panel and the second antenna panel.

26. The apparatus of claim 24, the at least one processor further configured to cause the apparatus to:

receive, via the transceiver, a cross-multiplexing indication that indicates whether the UE is allowed to transmit uplink control information associated with the second antenna panel via the first antenna panel, wherein resolving the overlap is further based at least in part on the cross-multiplexing indication.

27. The apparatus of claim 26, the at least one processor further configured to cause the apparatus to:

determine, based at least in part on the cross-multiplexing indication, that uplink control information associated with the second antenna panel must be transmitted via the second antenna panel;

identify, among the first set of one or more uplink communications associated with the first antenna panel, a first uplink communication having a first priority index and a second uplink communication having a second priority index greater than the first priority index;

identify, among the second set of one or more uplink communications associated with the second antenna panel, a third uplink communication having the first priority index and a fourth uplink communication having the second priority index; and select, based at least in part on the one or more rules, an uplink communication from among a set of candidate communications that comprises the first uplink communication, the second uplink communication, the third uplink communication, and the fourth uplink communication, wherein the transmitting comprises transmitting the selected uplink communication.

28. The apparatus of claim 27, wherein:

to select the uplink communication, the at least one processor is configured to cause the apparatus to:

select, from among the first uplink communication and the second uplink communication, a first uplink shared channel communication based at least in part on a priority index of the first uplink shared channel communication; and select, from among the third uplink communication and the fourth uplink communication, a second uplink shared channel communication based at least in part on a priority index of the second uplink shared channel communication; and to transmit at least the portion of the first set of one or more uplink communications, at least the portion of the second set of one or more uplink communications, or the combination thereof, the at least one processor is configured to cause the apparatus to:

transmit the first uplink shared channel communication via the first antenna panel; and transmit the second uplink shared channel communication via the second antenna panel.

29. The apparatus of claim 27, wherein the at least one processor is configured to cause the apparatus to select the uplink communication based at least in part on a respective priority index for each candidate communication of the set of candidate communications, a respective antenna panel associated with each candidate communication of the set of candidate communications, a respective channel type for each candidate communication of the set of candidate communications, a respective type of uplink control information associated with each candidate communication of the set of candidate communications, or any combination thereof.

30. The apparatus of claim 25, the at least one processor further configured to cause the apparatus to:

receive, via the transceiver, a cross-multiplexing indication that uplink control information associated with the second antenna panel may be transmitted via the first antenna panel;

identify, among the first set of one or more uplink communications associated with the first antenna panel, a first uplink communication having a first priority index and a second uplink communication having a second priority index greater than the first priority index;

identify, among the second set of one or more uplink communications associated with the second antenna panel, a third uplink communication having the first priority index and a fourth uplink communication having the second priority index; and select, based at least in part on the cross-multiplexing indication and the one or more rules, an uplink communication from among a set of candidate communications that comprises the first uplink communication, the second uplink communication, the third uplink communication, and the fourth uplink communication, wherein:

to select the uplink communication, the at least one processor is configured to cause the apparatus to select the uplink communication based at least in part on a respective priority index for each candidate communication of the set of candidate communications, a respective antenna panel associated with each candidate communication of the set of candidate communications, a respective channel type for each candidate communication of the set of candidate communications, or any combination thereof;

the selected uplink communication comprises the uplink control information associated with the respective antenna panel; and to transmit the at least a portion of the first set of one or more uplink communications, at least a portion of the second set of one or more uplink communications, or the combination thereof, the at least one processor is configured to cause the apparatus to transmit the selected uplink communication via the different antenna panel.

31. An apparatus for wireless communication at a user equipment (UE), comprising:

means for receiving an indication of a feedback mode for transmitting acknowledgement information for downlink communications associated with a first antenna panel of a set of antenna panels of the UE and a second antenna panel of the set of antenna panels;

means for identifying a first set of one or more uplink communications associated with the first antenna panel;

means for identifying a second set of one or more uplink communications associated with the second antenna panel, wherein the first set of one or more uplink communications are scheduled to at least partially overlap in time with the second set of one or more uplink communications;

means for resolving the overlap between the first set of one or more uplink communications and the second set of one or more uplink communications based at least in part on one or more rules for concurrent uplink communications associated with different antenna panels of the set of antenna panels and the indication of the feedback mode; and means for transmitting, based at least in part on resolving the overlap, at least a portion of the first set of one or more uplink communications, at least a portion of the second set of one or more uplink communications, or a combination thereof via at least one of the first antenna panel and the second antenna panel.

32. A non-transitory computer-readable medium storing code for wireless communication at a user equipment (UE), the code comprising instructions executable by a processor to:

receive an indication of a feedback mode for transmitting acknowledgement information for downlink communications associated with a first antenna panel of a set of antenna panels of the UE and a second antenna panel of the set of antenna panels;

identify a first set of one or more uplink communications associated with the first antenna panel;

identify a second set of one or more uplink communications associated with the second antenna panel, wherein the first set of one or more uplink communications are scheduled to at least partially overlap in time with the second set of one or more uplink communications;

resolve the overlap between the first set of one or more uplink communications and the second set of one or more uplink communications based at least in part on one or more rules for concurrent uplink communications associated with different antenna panels of the set of antenna panels and the indication of the feedback mode; and transmit, based at least in part on resolving the overlap, at least a portion of the first set of one or more uplink communications, at least a portion of the second set of one or more uplink communications, or a combination thereof via at least one of the first antenna panel and the second antenna panel.

33. A method for wireless communication at a user equipment (UE), comprising:

receiving an indication of a feedback mode for transmitting acknowledgement information for downlink communications associated with a first antenna panel of a set of antenna panels and a second antenna panel of the set of antenna panels;

receiving a cross-multiplexing indication that indicates whether the UE is allowed to transmit uplink control information associated with the second antenna panel via the first antenna panel;

identifying a first set of one or more uplink communications associated with the first antenna panel;

identifying a second set of one or more uplink communications associated with the second antenna panel, wherein the first set of one or more uplink communications are scheduled to at least partially overlap in time with the second set of one or more uplink communications;

resolving the overlap between the first set of one or more uplink communications and the second set of one or more uplink communications based at least in part on the indication of the feedback mode and the cross-multiplexing indication; and transmitting, based at least in part on resolving the overlap, at least a portion of the first set of one or more uplink communications, at least a portion of the second set of one or more uplink communications, or a combination thereof via at least one of the first antenna panel and the second antenna panel.

* * * * *